US012585513B2

(12) United States Patent
Wang et al.

(10) Patent No.:  US 12,585,513 B2
(45) Date of Patent:  Mar. 24, 2026

(54) DATA MANAGEMENT METHOD, APPARATUS, AND DEVICE, COMPUTER-READABLE STORAGE MEDIUM, AND SYSTEM

(71) Applicant: Huawei Technologies Co., Ltd., Shenzhen (CN)

(72) Inventors: Zitao Wang, Nanjing (CN); Ye Niu, Beijing (CN); Ran Tao, Shenzhen (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 829 days.

(21) Appl. No.: 17/870,474

(22) Filed: Jul. 21, 2022

(65) Prior Publication Data

US 2022/0358003 A1     Nov. 10, 2022

Related U.S. Application Data

(63) Continuation of application No. PCT/CN2020/119583, filed on Sep. 30, 2020.

(30) Foreign Application Priority Data

Jan. 22, 2020   (CN) ......................... 202010075689.X

(51) Int. Cl.
| | |
|---|---|
| G06F 9/54 | (2006.01) |
| G06F 16/215 | (2019.01) |
| H04L 41/00 | (2022.01) |

(52) U.S. Cl.
CPC ............ G06F 9/547 (2013.01); G06F 16/215 (2019.01); H04L 41/00 (2013.01)

(58) Field of Classification Search
CPC .......... G06F 9/449; G06F 9/547; G06F 9/548; H04L 67/133
See application file for complete search history.

(56) References Cited

U.S. PATENT DOCUMENTS

| | | | | |
|---|---|---|---|---|
| 8,335,171 | B1 * | 12/2012 | Purkayastha | ....... H04L 41/0863 370/254 |
| 9,094,299 | B1 * | 7/2015 | Rao D.S | ............. H04L 41/0803 |

(Continued)

FOREIGN PATENT DOCUMENTS

| | | |
|---|---|---|
| CN | 110391949 A | 10/2019 |

OTHER PUBLICATIONS

Clemm, A. et al., "Comparison of NMDA datastores draft-ietf-netmod-nmda-diff-03," Network Working Group, Internet-Draft, Intended status: Standards Track, Expires: May 7, 2020, Nov. 4, 2019, 17 pages.

(Continued)

*Primary Examiner* — Andy Ho
(74) *Attorney, Agent, or Firm* — Slater Matsil, LLP

(57) ABSTRACT

A data management method, apparatus, device, a computer-readable storage medium, and system are provided. The method is applied to a first network device, the first network device determines target invalid data existing in a second network device, the first network device obtains a first RPC, and the first RPC carries information about target invalid data that needs to be deleted. Then, the first network device sends the first RPC to the second network device, where the first RPC is used to indicate the second network device to delete the target invalid data. In this application, residual data is automatically identified, and the residual data is cleared, to automatically delete the residual data in batches, thereby saving device resources and improving an operation and maintenance management effect.

20 Claims, 15 Drawing Sheets

(56)  References Cited

U.S. PATENT DOCUMENTS

| | | | |
|---|---|---|---|
| 10,977,223 B2 * | 4/2021 | Ellis | G06F 16/2282 |
| 11,075,793 B2 * | 7/2021 | Luo | H04L 67/133 |
| 11,397,717 B2 * | 7/2022 | Baker | G06F 16/1756 |
| 2007/0073792 A1 | 3/2007 | Nichols et al. | |
| 2014/0365621 A1 | 12/2014 | Vieira | |

OTHER PUBLICATIONS

Bjorklund, M et al., "YANG—A Data Modeling Language for the Network Configuration Protocol (NETCONF)," Internet Engineering Task Force (IETF), Request for Comments: 6020, Category: Standards Track, ISSN: 2070-1721, Tail-f Systems, RFC6020, Oct. 2010, 173 pages.

Bjorklund, M. et al., "The YANG 1.1 Data Modeling Language," Internet Engineering Task Force (IETF), Request for Comments: 7950, Category: Standards Track, ISSN: 2070-1721, Tail-f Systems, Aug. 2016, 217 pages.

Clemm, A. et al., "Comparison of NMDA Datastores draft-ietf-netmod-nmda-diff-01," Network Working Group, Internet Draft, Intended Status: Standards Track, Expires: Nov. 24, 2019, YumaWorks, May 23, 2019, 15 pages.

Enns, R. et al., "NETCONF Configuration Protocol," Network Working Group, Request for Comments: 4741, Category: Standards Track, Juniper Networks, Dec. 2006, 95 pages.

Wu, Q. et al., "NMDA Base Notification for Intent Based Configuration Update draft-wu-netmod-base-notification-nmda-03," NETWOD Working Group, Internet-Draft, Intended Status: Standards Track, Expires: Dec. 31, 2019, Huawei, Jun. 29, 2019, 16 pages.

* cited by examiner

First network device

First network device

Second network
device

Second network
device

...

Second network
device

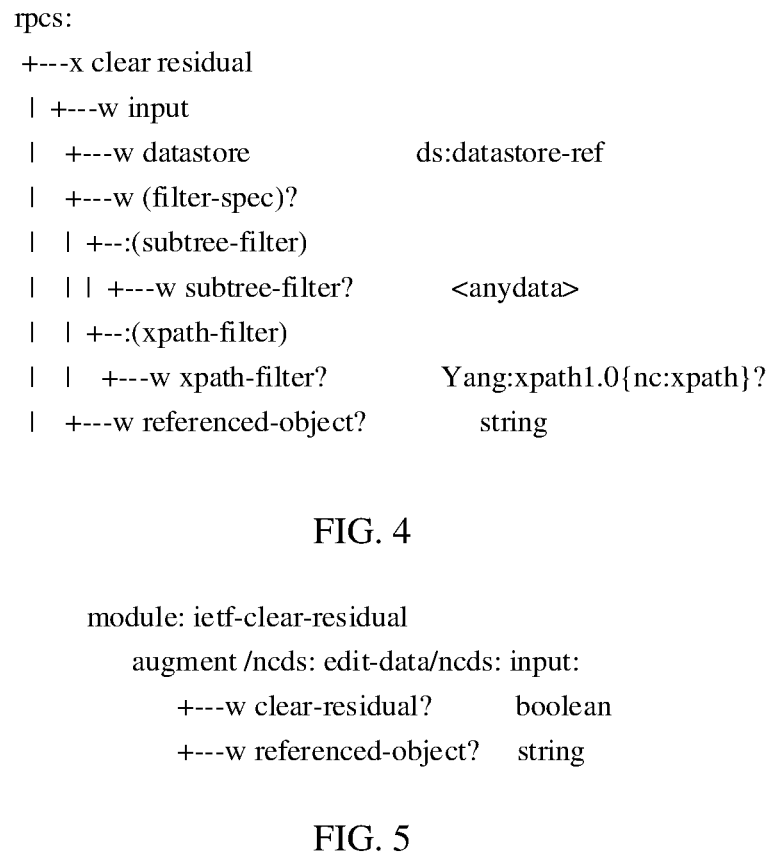

```
rpcs:
 +---x clear residual
 | +---w input
 |   +---w datastore              ds:datastore-ref
 |   +---w (filter-spec)?
 |   | +--:(subtree-filter)
 |   | | +---w subtree-filter?        <anydata>
 |   | +--:(xpath-filter)
 |   |   +---w xpath-filter?          Yang:xpath1.0{nc:xpath}?
 |   +---w referenced-object?          string
```

FIG. 4

```
module: ietf-clear-residual
    augment /ncds: edit-data/ncds: input:
        +---w clear-residual?       boolean
        +---w referenced-object?    string
```

FIG. 5

```
+---x forced-delete
    +---w input
        +---w datastore     ds:datastore-ref
        +---w target*        string
``` augment /ncds: edit-data/ncds: input:

+---w forced-delete?     boolean

+---w target*            string

1800

1900

DATA MANAGEMENT METHOD, APPARATUS, AND DEVICE, COMPUTER-READABLE STORAGE MEDIUM, AND SYSTEM

CROSS-REFERENCE TO RELATED APPLICATIONS

This application is a continuation of International Application No. PCT/CN2020/119583, filed on Sep. 30, 2020, which claims priority to Chinese Patent Application No. 202010075689.X, filed on Jan. 22, 2020. The disclosures of the aforementioned applications are hereby incorporated by reference in their entireties.

TECHNICAL FIELD

This application relates to the communications field, and in particular, to a data management method, apparatus, and device, a computer-readable storage medium, and a system.

BACKGROUND

Requirement For Comments (RFC) 8342 redefines a network management datastore architecture (NMDA) for datastores (datastore) in a Network Configuration Protocol (NETCONF)/Representational State Transfer Configuration (RESTCONF). Based on conventional datastores (candidate, startup, and running) in RFC 6241, the NMDA is added with two datastores, intended and operational, to separate configuration data from state data.

The Intended datastore is a configuration datastore that stores configuration data that is intendedly configured by a user and that is valid. The operational datastore is used to store a complete running status (including effective configuration data and state data, such as system configuration data, default configuration data, and learned configuration data, as shown in RFC 8342) on a device.

In the NMDA architecture, residual data exists. Therefore, it is urgent to provide a data management method to clear the residual data.

SUMMARY

Embodiments of this application provide a data management method, apparatus, and device, a computer-readable storage medium, and a system, to resolve a problem in related technologies. Technical solutions are as follows.

According to a first aspect, a data management method is provided. An example in which the method is applied to a first network device is used. The first network device determines target invalid data existing in a second network device. The first network device obtains a first remote procedure call (RPC), where the first RPC carries information about target invalid data that needs to be deleted. Then, the first network device sends the first RPC to the second network device, where the first RPC is used to indicate the second network device to delete the target invalid data.

In an example embodiment, a manner in which the first network device determines target invalid data existing in the second network device includes but is not limited to the following three manners.

Manner 1: A manner in which the first network device determines target invalid data existing in the second network device includes that the first network device sends a second RPC to the second network device, where the second RPC is used to indicate the second network device to perform data difference comparison, and then the first network device receives a data difference comparison result returned by the second network device, and determines, based on the difference comparison result, the target invalid data existing in the second network device.

In an example embodiment, before the first network device sends the second RPC to the second network device, the first network device receives a base event notification sent by the second network device, where the base event notification is used to indicate that invalid data exists in the second network device. Then, the first network device determines, based on the base event notification, that invalid data exists in the second network device, and triggers to perform an operation of sending the second RPC to the second network device.

Manner 2: That the first network device determines target invalid data existing in the second network device includes that the first network device sends a third RPC to the second network device, where the third RPC is used to indicate the second network device to return first data, the first network device receives the first data returned by the second network device, and based on a response that second data referenced by the first data does not exist, the first network device determines that the first data is the target invalid data existing in the second network device.

Manner 3: A manner in which the first network device determines target invalid data existing in the second network device includes that the first network device sends a third RPC to the second network device, where the third RPC is used to indicate the second network device to return first data, the first network device receives an error identifier returned by the second network device, where the error identifier indicates that second data referenced by the first data has been deleted, and the first network device determines, based on the error identifier, the first data as the target invalid data existing in the second network device.

In an example embodiment, before the first network device determines the target invalid data existing in the second network device, the first network device establishes a network configuration session with the second network device. The first network device receives, based on the network configuration session, a residual network configuration data clearing capability that is sent by the second network device and that is supported by the second network device.

In an example embodiment, the first RPC is a new RPC, where an input argument of the new RPC includes the information about the target invalid data that needs to be deleted. Alternatively, the first RPC is an extended RPC obtained by extending an existing RPC, and the extended RPC carries the information about the target invalid data that needs to be deleted.

In an example embodiment, after the first network device sends the first RPC to the second network device, the first network device reads the target invalid data in the second network device, and verifies, based on a reading result, whether the target invalid data is cleared.

In an example embodiment, the target invalid data is data corresponding to a referred node, and a data model in which a referring node corresponding to the referred node is located includes an extended first statement, where the first statement is used to indicate to automatically and associatively delete data corresponding to the referring node when the target invalid data is deleted.

In an example embodiment, the target invalid data is data corresponding to a referred node, and a data model in which the target invalid data is located includes an extended second statement, where the second statement is used to indicate to associatively delete data corresponding to all referring nodes when the target invalid data is deleted.

According to a second aspect, a data management method is provided. An example in which the method is applied to a second network device is used. The second network device receives a first RPC sent by a first network device, where the first RPC carries information about target invalid data that needs to be deleted. Then, the second network device deletes the target invalid data based on the first RPC.

In an example embodiment, before the second network device receives the first RPC sent by the first network device, the second network device receives a second RPC sent by the first network device, where the second RPC is used to indicate the second network device to perform data difference comparison. The second network device performs data difference comparison based on the second RPC, to obtain a data difference comparison result. Then, the second network device returns the data difference comparison result to the first network device, where the difference comparison result is used by the first network device to determine target invalid data existing in the second network device.

In an example embodiment, before the second network device receives the second RPC sent by the first network device, the second network device sends a base event notification to the first network device, where the base event notification is used to indicate that invalid data exists in the second network device.

In an example embodiment, before the second network device receives the first RPC sent by the first network device, the method further includes that the second network device receives a third RPC sent by the first network device, where the third RPC is used to indicate the second network device to return first data, and the second network device returns the first data to the first network device based on the third RPC, where the first data is used by the first network device to determine the target invalid data existing in the second network device.

In an example embodiment, before the second network device receives the first RPC sent by the first network device, the method further includes that the second network device receives a third RPC sent by the first network device, where the third RPC is used to indicate the second network device to return first data, and the second network device returns an error identifier to the first network device, where the error identifier is used to indicate that second data referenced by the first data has been deleted.

In an example embodiment, before the second network device receives the first RPC sent by the first network device, the method further includes that the second network device establishes a network configuration session with the first network device, and the second network device sends, based on the network configuration session, a residual network configuration data clearing capability that is supported by the second network device to the first network device.

In an example embodiment, the target invalid data is data corresponding to a referred node, and a data model in which a referring node corresponding to the referred node is located includes an extended first statement, where the first statement is used to indicate to automatically and associatively delete data corresponding to the referring node when the target invalid data is deleted.

After the second network device deletes the target invalid data based on the first RPC, the method further includes that the second network device automatically and associatively deletes, based on the first statement, the data corresponding to the referring node.

In an example embodiment, the target invalid data is data corresponding to a referred node, and a data model in which the target invalid data is located includes an extended second statement, where the second statement is used to indicate to associatively delete data corresponding to all referring nodes when the target invalid data is deleted.

After the second network device deletes the target invalid data based on the first RPC, the method further includes that the second network device associatively deletes, based on the second statement, the data corresponding to all the referring nodes.

According to a third aspect, a data management apparatus is provided, where the apparatus includes a processing unit, configured to determine target invalid data existing in a second network device and obtain a first RPC, where the first RPC carries information about target invalid data that needs to be deleted, and a communications unit, configured to send the first RPC to the second network device, where the first RPC is used to indicate the second network device to delete the target invalid data.

In an example embodiment, the communications unit is configured to send a second RPC to the second network device, where the second RPC is used to indicate the second network device to perform data difference comparison, and receive a data difference comparison result returned by the second network device.

The processing unit is configured to determine, based on the difference comparison result, the target invalid data existing in the second network device.

In an example embodiment, the communications unit is further configured to receive a base event notification sent by the second network device, where the base event notification is used to indicate that invalid data exists in the second network device.

The processing unit is further configured to determine, based on the base event notification, that invalid data exists in the second network device, and trigger the communications unit to perform an operation of sending the second RPC to the second network device.

In an example embodiment, the communications unit is configured to send a third RPC to the second network device, where the third RPC is used to indicate the second network device to return first data, and receive the first data returned by the second network device.

The processing unit is configured to, based on a response that second data referenced by the first data does not exist, determine that the first data is the target invalid data existing in the second network device.

In an example embodiment, the communications unit is configured to send a third RPC to the second network device, where the third RPC is used to indicate the second network device to return first data, and receive an error identifier returned by the second network device, where the error identifier indicates that second data referenced by the first data has been deleted.

The processing unit is configured to determine, based on the error identifier, the first data as the target invalid data existing in the second network device.

In an example embodiment, the communications unit is further configured to establish a network configuration session with the second network device, and receive, based on the network configuration session, a residual network configuration data clearing capability that is sent by the second network device and that is supported by the second network device.

In an example embodiment, the first RPC is a new RPC, where an input argument of the new RPC includes the information about the target invalid data that needs to be deleted.

Alternatively, the first RPC is an extended RPC obtained by extending an existing RPC, and the extended RPC carries the information about the target invalid data that needs to be deleted.

In an example embodiment, the communications unit is further configured to read the target invalid data in the second network device.

The processing unit is further configured to verify, based on a reading result of the communications unit, whether the target invalid data is cleared.

In an example embodiment, the target invalid data is data corresponding to a referred node, and a data model in which a referring node corresponding to the referred node is located includes an extended first statement, where the first statement is used to indicate to automatically and associatively delete data corresponding to the referring node when the target invalid data is deleted.

In an example embodiment, the target invalid data is data corresponding to a referred node, and a data model in which the target invalid data is located includes an extended second statement, where the second statement is used to indicate to associatively delete data corresponding to all referring nodes when the target invalid data is deleted.

According to a fourth aspect, a data management apparatus is provided, where the apparatus includes a communications unit, configured to receive a first RPC sent by a first network device, where the first RPC carries information about target invalid data that needs to be deleted, and a processing unit, configured to delete the target invalid data based on the first RPC.

In an example embodiment, the communications unit is further configured to receive a second RPC sent by the first network device, where the second RPC is used to indicate the data management apparatus to perform data difference comparison.

The processing unit is further configured to perform, based on the second RPC, data difference comparison, to obtain a data difference comparison result.

The communications unit is further configured to return the data difference comparison result to the first network device, where the difference comparison result is used by the first network device to determine target invalid data existing in the second network device.

In an example embodiment, the communications unit is further configured to send a base event notification to the first network device, where the base event notification is used to indicate that invalid data exists in the second network device.

In an example embodiment, the communications unit is further configured to receive a third RPC sent by the first network device, where the third RPC is used to indicate the second network device to return first data, and return the first data to the first network device based on the third RPC, where the first data is used by the first network device to determine that the first data is the target invalid data existing in the second network device.

In an example embodiment, the communications unit is further configured to receive a third RPC sent by the first network device, where the third RPC is used to indicate the second network device to return first data, and return an error identifier to the first network device, where the error identifier is used to indicate that second data referenced by the first data has been deleted.

In an example embodiment, the communications unit is further configured to establish a network configuration session with the first network device, and send, based on the network configuration session, a residual network configuration data clearing capability that is supported by the second network device to the first network device.

In an example embodiment, the target invalid data is data corresponding to a referred node, and a data model in which a referring node corresponding to the referred node is located includes an extended first statement, where the first statement is used to indicate to automatically and associatively delete data corresponding to the referring node when the target invalid data is deleted.

The processing unit is further configured to automatically and associatively delete, based on the first statement, the data corresponding to the referring node.

In an example embodiment, the target invalid data is data corresponding to a referred node, and a data model in which the target invalid data is located includes an extended second statement, where the second statement is used to indicate to associatively delete data corresponding to all referring nodes when the target invalid data is deleted.

The processing unit is further configured to associatively delete, based on the second statement, the data corresponding to all the referring nodes.

According to a fifth aspect, a data management device is provided. The device includes a memory and a processor, where the memory stores at least one instruction, and the at least one instruction is loaded and executed by the processor, to implement any data management method in the foregoing first aspect or second aspect.

According to a sixth aspect, a computer-readable storage medium is provided. The storage medium stores at least one instruction, and the instruction is loaded and executed by a processor, to implement any data management method in the foregoing first aspect or second aspect.

According to a seventh aspect, a data management system is provided. The system includes a first network device and a second network device, where the first network device is configured to perform any data management method in the first aspect, and the second network device is configured to perform any data management method in the second aspect.

Another communications apparatus is provided. The apparatus includes a transceiver, a memory, and a processor. The transceiver, the memory, and the processor communicate with each other through an internal connection path. The memory is configured to store instructions. The processor is configured to execute the instructions stored in the memory, to control the transceiver to receive a signal and control the transceiver to send a signal. When the processor executes the instructions stored in the memory, the processor performs the method in the first aspect or any possible implementation of the first aspect.

In an example embodiment, there are one or more processors, and there are one or more memories.

In an example embodiment, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

A computer program (product) is provided, where the computer program (product) includes computer program code. When the computer program code is executed by a computer, the computer performs the methods in the foregoing aspects.

A chip is provided, including a processor, configured to call, from a memory, and run instructions stored in the memory, so that a communications device on which the chip is installed performs the methods in the foregoing aspects.

Another chip is provided, including an input interface, an output interface, a processor, and a memory, where the input interface, the output interface, the processor, and the memory are connected through an internal connection path, the processor is configured to execute code in the memory, and when the code is executed, the processor is configured to perform the methods in the foregoing aspects.

BRIEF DESCRIPTION OF THE DRAWINGS

FIG. 4 is a schematic diagram of a tree structure of a configuration subscription data model according to an embodiment of this application;

FIG. 5 is a schematic diagram of a tree structure of a configuration subscription data model according to an embodiment of this application;

DETAILED DESCRIPTION OF ILLUSTRATIVE EMBODIMENTS

Figure 1:
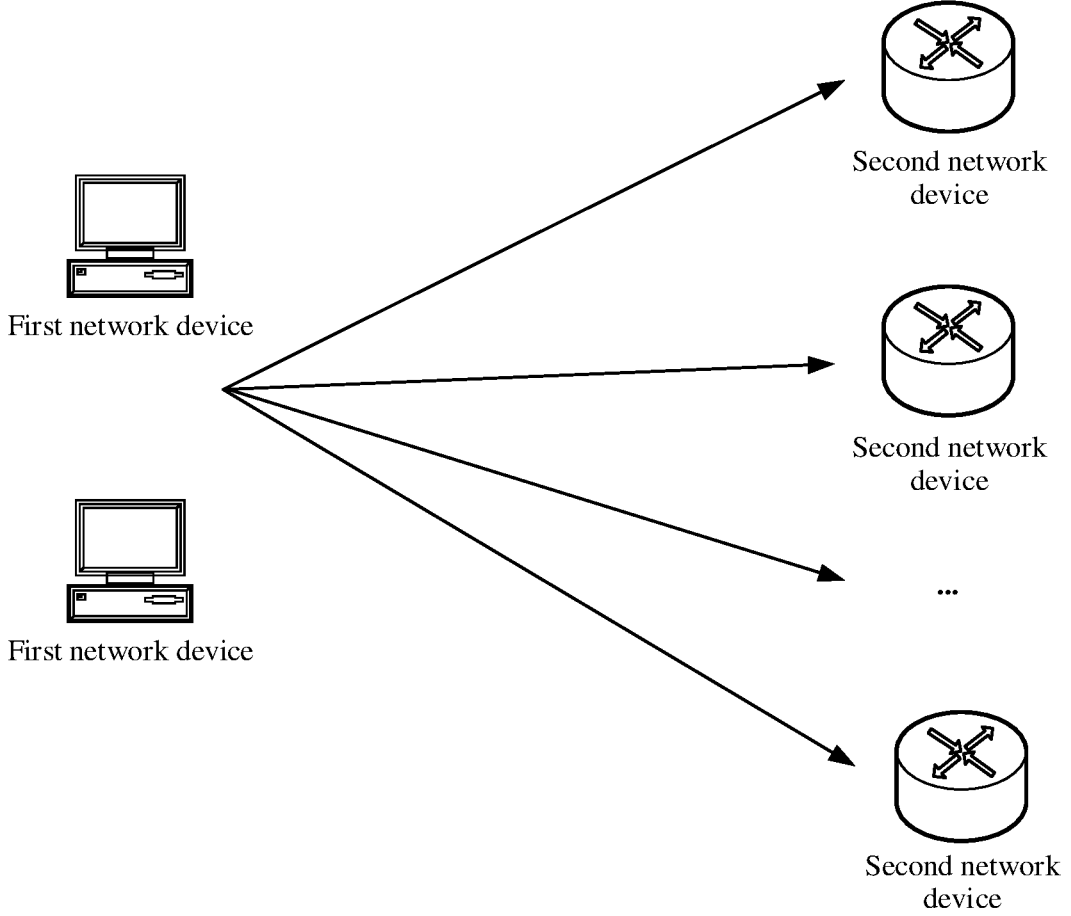
FIG. 1 is a schematic diagram of an application scenario according to an embodiment of this application.

Terms used in embodiments of this application are only used to explain specific embodiments of this application, but are not intended to limit this application.

RFC 8342 redefines an NMDA for datastores in NET-CONF/RESTCONF. NETCONF is a protocol that provides configuration management of network data devices and uses an extensible markup language based data encoding for configuration data and protocol information. The NET-CONF provides mechanisms to install, manipulate, and delete configurations of network elements. RESTCONF is a protocol based on a Hypertext Transfer Protocol (HTTP). The RESTCONF configures data in YANG according to a data storage concept defined in the NETCONF. YANG is a modular language defined by the Internet Engineering Task Force (IETF) standards organization for network configuration management data, to support complete description of data between a NETCONF client and a NETCONF server. A YANG model is used to describe configuration data, state data, RPCs, and notifications exchanged between the NET-CONF client and the NETCONF server. For a definition and description of YANG, refer to related descriptions in Requirement For Comments (RFC) 6020 and RFC 7950.

Based on conventional datastores (candidate, startup, and running) in RFC 6241, the NMDA is added with two datastores, intended and operational, to separate configuration data from state data. The intended datastore is a configuration datastore that stores configuration data that is intendedly configured by a user and that is valid. The operational datastore is used to store a complete running status (including effective configuration data and state data, such as system configuration data, default configuration data, and learned configuration data, as shown in RFC 8342) on a device.

In the NMDA architecture, residual data may usually exist. The following scenarios are used as examples.

Scenario 1: Residual Data of a Field Replaceable Unit (FRU)

The FRU is a circuit board, a part, or a component in an electronic device. A user or technician can quickly and easily remove the FRU from a personal computer (PC) or the electronic device and replace the FRU without having to send an entire product or system for repair. The FRU supports the NETCONF and allows the user to preconfigure some data, where the data may be stored in a running/intended datastore. However, if the FRU is not inserted into the device, the data is not enabled and is not delivered to an operational datastore. In other words, when the FRU is inserted into the device, the preconfigured data is delivered to the operational datastore and takes effect. After the FRU is removed, data in the operational datastore is deleted, and data in the running/intended datastore is retained. In this case, the preconfigured data stored in the running/intended datastore is residual data.

Scenario 2: Residual System Configuration Data

For system configuration data (for example, a system configuration about a loopback interface), if the <intended> datastore does not have related configuration, the system configures related data in the <operational> datastore. In this case, the <intended> datastore does not have system configuration data, and the <operational> datastore contains related configuration data. Sometimes, the user may further configure the system configuration data. The loopback inter-face is used as an example. Assume that the system configuration data is interface-name=et-o/o/o. In this case, the user may further configure the interface, for example, configure MTU=xx. The data is stored in the intended datastore and the running datastore together with the system configuration data and is delivered to the operational datastore for storage.

When the system configuration changes, data in the operational datastore is automatically deleted or updated, but data (system configuration data interface-name=et-o/o/o and user configuration data MTU=xx) in the intended datastore and the running datastore is retained. In this case, the system configuration data and the user configuration data in the intended datastore and the running datastore are residual data.

Scenario 3: Residual Data Such as an Associated Object in a Model

According to a definition in RFC 7950, for reference data "leafref", it is assumed that object A references object B. If object B does not exist, object A cannot be successfully created. If object B is deleted after object A has a leafref to object B, object A has no valid value, and an error should be reported in a normal case. To avoid the error, require-instance=false may be added under type leafref. Therefore, when require-instance=true is set, other objects that reference object B need to be queried one by one and then deleted one by one. Object B cannot be deleted until all the other objects are deleted. The operation process is complex. However, if require-instance=false is set, object B may be directly deleted. However, an error is reported when the other objects that reference object B are called. The objects that reference object B are residual data.

The foregoing describes only several scenarios in which residual data exists, and is not used to limit another scenario in which residual data exists. However, regardless of any type of residual data, device resources are occupied, and operation and maintenance management efficiency is affected. Therefore, it is urgent to provide a data management method to clear the residual data.

In this regard, an embodiment of this application provides a data management method. In the method, residual data is automatically identified and cleared, to implement automatic batch deletion of residual data, thereby saving device resources and improving an operation and maintenance management effect. A system architecture shown in FIG. 1 is used as an example in an application scenario of the method. In FIG. 1, the system architecture includes a first network device and a second network device. For example, the first network device runs a NETCONF/RESTCONF client, where the client is configured to call a protocol operation on a server, and the client may further subscribe to a receiving notification of the server. The second network device is a NETCONF/RESTCONF server, where the server performs a protocol operation called by the client, and the server may further send a notification to the client. For example, a plurality of datastores may run on both the first network device and the second network device. The datastore is used to store and access a conceptual location of information, for example, data storage may be implemented by using a file, a database, a flash location, or a combination thereof. A data interaction process between the datastores may be shown in FIG. 2.

Figure 2:
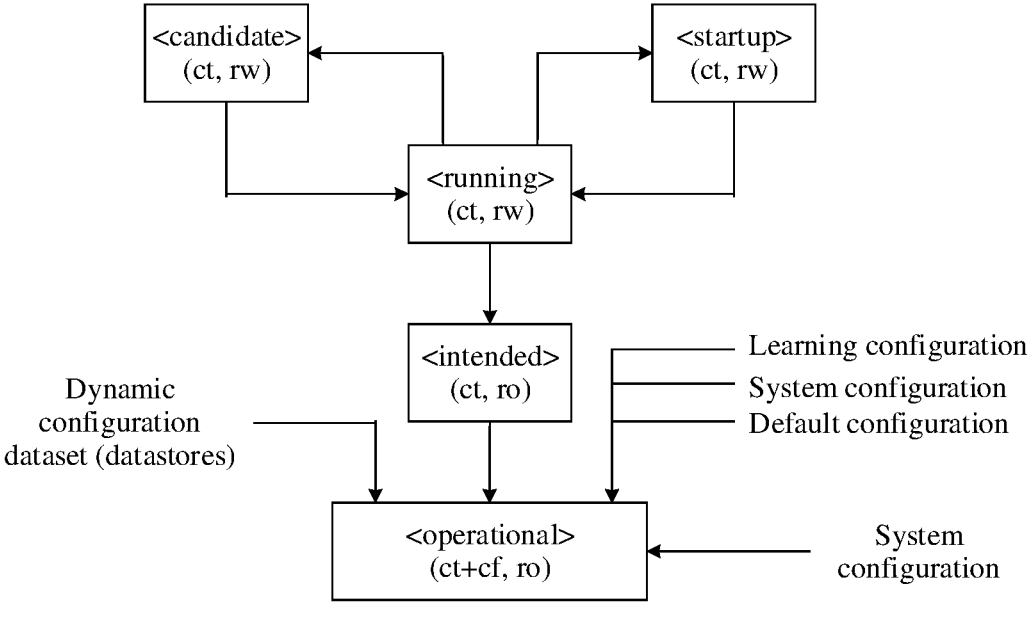
FIG. 2 is a schematic diagram of a data interaction process according to an embodiment of this application.

In FIG. 2, data <candidate>, <startup>, <running>, <intended>, and <operational> included in the datastore are used as examples. Interaction between the data may be shown in FIG. 2, where et represents that configuration is true, cf represents that configuration is false, rw represents read-write, ro represents read-only, and boxes denote named datastores. Using interaction between <running> and <intended> as an example, configuration conversion may be performed, for example, configuration information of a node marked as inactive is deleted. <intended> is used to verify whether the configuration information is reasonable. Data may be adjusted based on a specific condition of a device, for example, lack of resources and a delay.

Figure 3:
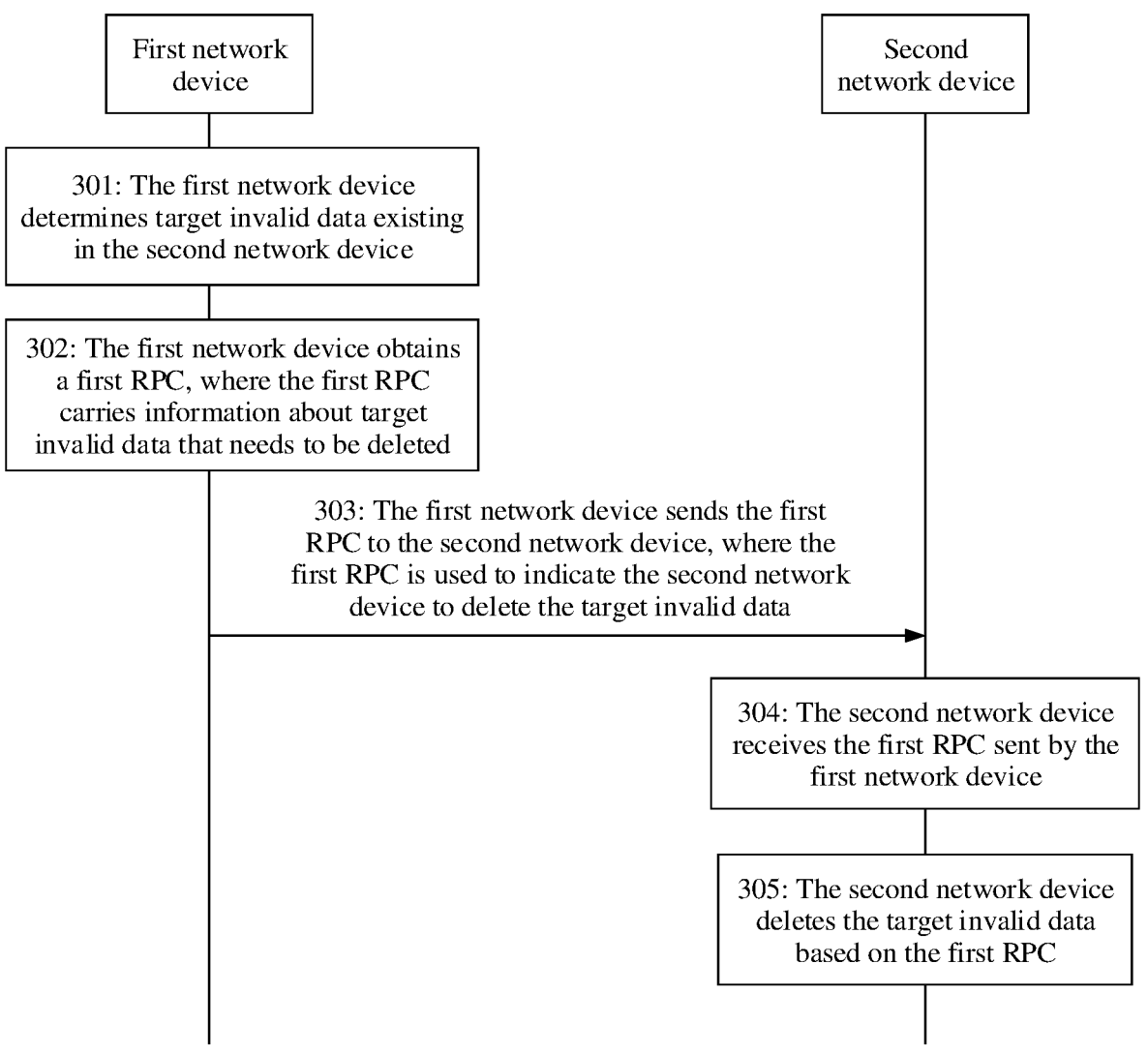
FIG. 3 is a flowchart of a data management method according to an embodiment of this application.

A process shown in FIG. 3 of a data management method provided in an embodiment of this application is used as an example to describe the method provided in this embodiment of this application. The method may be applied to a first network device and a second network device. Refer to FIG. 3. A process of the method includes the following procedures.

301: The first network device determines target invalid data existing in the second network device.

That the first network device determines target invalid data existing in the second network device includes but is not limited to the following three manners.

Manner 1: That the first network device determines target invalid data existing in the second network device includes that the first network device sends a second RPC to the second network device, where the second RPC is used to indicate the second network device to perform data difference comparison, and the first network device receives a data difference comparison result returned by the second network device, and determines, based on the difference comparison result, the target invalid data existing in the second network device.

In this manner, a plurality of datastores defined for an NMDA architecture implement separation between configuration data and state data. Therefore, data in different datastores may be different. However, draft-ietf-netmod-nmda-diff defines a compare RPC to compare and output a data difference between different datastores. Therefore, in the method provided in this embodiment of this application, when determining the target invalid data existing in the second network device, the first network device may use the compare RPC as the second RPC, and send the second RPC to the second network device, to indicate the second network device to perform data difference comparison. After the second network device obtains the data difference comparison result, the first network device receives the data difference comparison result returned by the second network device, and further determines, based on the difference comparison result, the target invalid data existing in the second network device.

In an example embodiment, because Nmda-base-event (draft-wu-netmod-base-notification-nmda) uses the compare RPC as a tool for determining whether intended configuration data is written into an operational datastore, when the intended configuration data cannot be successfully written into the operational datastore, a notification is triggered, and an error cause is reported to a client. Therefore, the NMDA-Base-event may be used as a method for determining invalid data. In this regard, in an example embodiment, the Nmda-base-event is used as a base event notification. In this case, before the first network device sends the second RPC to the second network device, the method further includes that the first network device receives a base event notification sent by the second network device, where the base event notification is used to indicate that invalid data exists in the second network device, and the first network device determines, based on the base event notification, that invalid data exists in the second network device, and triggers to perform an operation of sending the second RPC to the second network device.

In other words, after determining, based on the base event notification, that invalid data exists in the second network device, the first network device sends the second RPC to the second network device, to trigger the second network device to perform data difference comparison. For example, when the second network device determines that invalid data exists in the second network device, the second network device sends the Nmda-base-event to the first network device. The first network device receives the Nmda-base-event sent by the second network device, and the first network device determines, based on the Nmda-base-event, that invalid data exists in the second network device. Then, the first network device sends the compare RPC to the second network device, to trigger the second network device to perform data difference comparison and send the data difference comparison result to the first network device.

It is not difficult to learn that in manner 1, the second network device actively reports that invalid data exists in the second network device to the first network device, so that the first network device sends the compare RPC to the second network device, to trigger the second network device to perform data difference comparison.

Manner 2: That the first network device determines target invalid data existing in the second network device includes that the first network device sends a third RPC to the second network device, where the third RPC is used to indicate the second network device to return first data, the first network device receives the first data returned by the second network device, and based on a response that second data referenced by the first data does not exist, the first network device determines that the first data is the target invalid data existing in the second network device.

Different from manner 1, in manner 2 provided in this embodiment of this application, when the second network device does not actively trigger to report that invalid data exists in the second network device, the first network device actively determines whether the second network device has invalid data. For example, the first network device sends the third RPC to the second network device, to indicate, by using the third RPC, the second network device to return the first data, and determines, by detecting whether the second data referenced by the first data exists, whether invalid data exists in the second network device. For example, the third RPC may be a get/get-config-get-data RPC. The first network device sends the get/get-config-get-data RPC to the second network device, to trigger the second network device to return the corresponding first data. For example, determining residual data of a leafref instance is used as an example. If the first data in <intended>/<running> references a piece of nonexistent second data, it is determined that the first data is the residual data of the leafref instance.

Manner 3: That the first network device determines target invalid data existing in the second network device includes that the first network device sends a third RPC to the second network device, where the third RPC is used to indicate the second network device to return first data, the first network device receives an error identifier returned by the second network device, where the error identifier indicates that second data referenced by the first data has been deleted, and the first network device determines, based on the error identifier, the first data as the target invalid data existing in the second network device.

Manner 3 is similar to manner 2. An example in which the first network device actively determines whether the second network device has invalid data is used. In manner 3, the first network device calls the first data in the second network device by using the third RPC. If the second data referenced by the first data has been deleted, the second network device returns an error identifier to the first network device, where the error identifier is used to indicate that the second data has been deleted. In this case, the first network device determines the first data as the target invalid data existing in the second network device.

Regardless of which manner is used to determine the target invalid data, the method provided in this embodiment of this application supports negotiation on a residual data clearing capability between the first network device and the second network device. In an example embodiment, before the first network device determines the target invalid data existing in the second network device, the method further includes that the first network device establishes a network configuration session with the second network device, and the first network device receives, based on the network configuration session, a residual network configuration data clearing capability that is sent by the second network device and that is supported by the second network device.

For example, the first network device establishes a NET-CONF/RESTCONF session with the second network device, and performs, based on the NETCONF/RESTCONF session, negotiation on a capability of clearing invalid residual data, and the second network device sends a NET-CONF/RESTCONF residual data clearing capability supported by the second network device to the first network device, to allow the first network device to use a residual data clearing function. For example, the residual data clearing capability is defined as follows.

```
Netconf clear capability:
    urn:ietf:params:netconf:capability:clear-residual:1.0
Restconf clear capability:
    urn:ietf:params:restconf:capability:clear-residual:1.0
```

302: The first network device obtains a first RPC, where the first RPC carries information about target invalid data that needs to be deleted.

After the first network device determines the target invalid data existing in the second network device, the first network device triggers, by sending the first RPC to the second network device, the second network device to delete the target invalid data, to save device resources. The first RPC may be a new RPC that is defined in this embodiment of this application to clear residual data. Based on the first RPC, the second network device is allowed to delete residual data in a specified datastore. In other words, the first RPC is a new RPC, where an input argument of the first RPC includes the information about the target invalid data that needs to be deleted.

In addition to defining a new RPC to indicate a manner of deleting residual data, this embodiment of this application further supports extension of an existing RPC to implement a function of indicating to delete residual data. An extension manner is not limited in this embodiment of this application. In an example embodiment, the first RPC is an extended RPC obtained by extending an existing RPC, and the extended RPC carries the information about the target invalid data that needs to be deleted. For example, when an existing RPC is extended to obtain an extended RPC, extension may be performed based on original edit-data of the original Netconf to add a function of deleting residual data. Optionally, a new operation attribute, to be specific, clearing residual data, may be added to an "operation" attribute in a config element under edit-config/edit-data.

In addition, the information that is carried in the first RPC and that is about the target invalid data that needs to be deleted is not limited in this embodiment of this application. For example, the information about the target invalid data that needs to be deleted may include information about a datastore in which the target invalid data is located. In addition, in an example embodiment, the information about the target invalid data that needs to be deleted may further include information about other data that references the target invalid data.

303: The first network device sends the first RPC to the second network device, where the first RPC is used to indicate the second network device to delete the target invalid data.

In an example embodiment, the first network device may send the first RPC to the second network device based on the NETCONF/RESTCONF session established with the second network device. In addition, the first RPC may be further sent in another manner. This is not limited in this embodiment of this application.

For example, after the first network device sends the first RPC to the second network device, the method further includes that the first network device reads the target invalid data in the second network device, and verifies, based on a reading result, whether the target invalid data is cleared. By reading the target invalid data in the second network device to verify whether the target invalid data is cleared, validity of data management may be further improved.

In this embodiment of this application, a manner in which the first network device reads the target invalid data in the second network device is not limited. For example, the first network device reads the target invalid data in the second network device by calling get-data/get-config/get, and verifies, based on a reading result, whether the target invalid data is cleared. A processing manner of verifying, based on a reading result, that the invalid target data is not cleared is not limited in this embodiment of this application. For example, if the reading result indicates that the first network device successfully reads the target invalid data, it indicates that the target invalid data is not successfully deleted. In this case, the method may be repeatedly performed to delete the target invalid data again. For example, after verifying, based on a reading result, that the target invalid data is not cleared, an alarm may be sent to prompt manual deletion.

304: The second network device receives the first RPC sent by the first network device.

In an example embodiment, a manner in which the second network device receives the first RPC may be determined based on a manner in which the first network device sends the first RPC. For example, if the first network device sends the first RPC to the second network device based on the NETCONF/RESTCONF session established with the second network device, the second network device receives, based on the NETCONF/RESTCONF session established with the first network device, the first RPC sent by the first network device. In addition, the first RPC may be further received in another manner. This is not limited in this embodiment of this application.

In an example embodiment, for the manner in which the first network device determines the target invalid data existing in the second network device in 301, before the second network device receives the first RPC sent by the first network device, the method further includes but is not limited to the following three cases.

Case 1: Before the second network device receives the first RPC sent by the first network device, the second network device receives a second RPC sent by the first network device, where the second RPC is used to indicate the second network device to perform data difference comparison. The second network device performs data difference comparison based on the second RPC, to obtain a data difference comparison result. The second network device returns the data difference comparison result to the first network device, where the difference comparison result is used by the first network device to determine the target invalid data existing in the second network device.

Refer to the description of manner 1 in 301. For example, the second RPC may be a compare RPC. In addition, in the method provided in this embodiment of this application, origin metadata may be further defined to identify invalid residual data. In this case, the second network device receives the second RPC sent by the first network device. The compare RPC is used as an example. The second network device performs data difference comparison based on the compare RPC, to obtain a data difference comparison result. For example, the second network device may compare a data difference between the <intended>/<running> datastore and the <operational> datastore. If the <intended>/<running> datastore has data that is not available in the <operational> datastore and the data is marked as non-effective residual data, it is determined that the data is residual data of FRUs or residual system configuration data, that is, target invalid data. The second network device may return the residual data of FRUs or the residual system configuration data to the first network device as a data difference comparison result, so that the first network device determines, based on the data difference comparison result, the target invalid data existing in the second network device.

In an example embodiment, by referring to 301, because the Nmda-base-event (draft-wu-netmod-base-notification-nmda) uses the compare RPC as the tool for determining whether the intended configuration data is written into the operational datastore, when the intended configuration data cannot be successfully written into the operational datastore, a notification is triggered, and an error cause is reported to the client. Therefore, the NMDA-Base-event may be used as the method for determining invalid data. In this regard, in an example embodiment, the Nmda-base-event is used as a base event notification. Before the second network device receives the second RPC sent by the first network device, the second network device sends the base event notification to the first network device, where the base event notification is used to indicate that invalid data exists in the second network device.

For example, when the second network device determines that the residual data of FRUs or the residual system configuration data exists in the second network device, the second network device sends the Nmda-base-event to the first network device. The first network device receives the Nmda-base-event sent by the second network device, and the first network device determines, based on the Nmda-base-event, that invalid data exists in the second network device.

It is not difficult to learn that in case 1, the second network device actively reports that invalid data exists in the second network device to the first network device, so that the first network device sends the compare RPC to the second network device, to trigger the second network device to perform data difference comparison.

Case 2: Before the second network device receives the first RPC sent by the first network device, the method further includes that the second network device receives a third RPC sent by the first network device, where the third RPC is used to indicate the second network device to return first data, and the second network device returns the first data to the first network device based on the third RPC, where the first data is used by the first network device to determine the target invalid data existing in the second network device.

Different from case 1, the second network device may not actively report that invalid data exists in the second network device to the first network device. Instead, the first network device actively determines whether the second network device has invalid data. For example, the first network device sends the third RPC to the second network device, to indicate, by using the third RPC, the second network device to return the first data, and determines, by detecting whether second data referenced by the first data exists, whether invalid data exists in the second network device. For example, the third RPC may be a get/get-config-get-data RPC. The second network device receives the get/get-config-get-data RPC sent by the first network device, to trigger the second network device to return the corresponding first data. In this way, after determining that the second data referenced by the first data does not exist, the first network device determines the first data as the target invalid data.

Case 3: Before the second network device receives the first RPC sent by the first network device, the method further includes that the second network device receives a third RPC sent by the first network device, where the third RPC is used to indicate the second network device to return first data, and the second network device returns an error identifier to the first network device, where the error identifier is used to indicate that second data referenced by the first data has been deleted.

As described in manner 3 in 301, case 3 is similar to case 2. An example in which the first network device actively determines whether the second network device has invalid data. In case 3, because the first network device calls the first data in the second network device by using the third RPC, and the second data referenced by the first data in the second network device has been deleted, the second network device returns an error identifier to the first network device, where the error identifier is used to indicate that the second data referenced by the first data has been deleted. In this way, the first network device determines the first data as the target invalid data existing in the second network device.

In any one of the foregoing cases, the second network device may negotiate with the first network device on a residual data clearing capability, and notify the first network device that the second network device supports the residual data clearing capability, to allow the first network device to use the residual data clearing function. Therefore, in an example embodiment, before the second network device receives the first remote procedure call RPC sent by the first network device, the method further includes that the second network device establishes a network configuration session with the first network device, and the second network device sends, based on the network configuration session, a residual network configuration data clearing capability that is supported by the second network device to the first network device. For example, the residual data clearing capability is defined as follows.

Netconf clear capability:
urn:ietf:params:netconf:capability:clear-residual:1.0

-continued

Restconf clear capability:
urn:ietf:params:restconf:capability:clear-residual:1.0

305: The second network device deletes the target invalid data based on the first RPC.

Because the first RPC received by the second network device is used to indicate to delete the target invalid data, and the first RPC carries the information about the target invalid data that needs to be deleted, the second network device deletes the target invalid data based on the information about the target invalid data in the first RPC.

For example, the information about the target invalid data that needs to be deleted may include information about a datastore in which the target invalid data is located. In this case, the second network device deletes the target invalid data based on the information that is about the datastore in which the target invalid data is located and that is in the first RPC. In addition, in an example embodiment, the information about the target invalid data that needs to be deleted may further include information about other data that references the target invalid data. In this case, in addition to deleting the target invalid data based on the information that is about the datastore in which the target invalid data is located and that is in the first RPC, the second network device further deletes, based on the information about the other data that references the target invalid data, the other data that references the target invalid data.

In conclusion, in the method provided in this embodiment of this application, invalid data is determined, and an RPC for clearing invalid data is called to clear the invalid data, thereby saving device resources and improving operation and maintenance management efficiency. In addition, when the invalid data is cleared, because the method provided in this embodiment of this application further supports deletion of other data that references the invalid data, the device resources may be further saved, and the operation and maintenance management efficiency may be improved.

For ease of understanding, in the following description, an example in which the first network device functions as a client, the second network device functions as a server, and a YANG data model is defined in the client and the server is used to describe a subscription data flow type and a subscription event type, to implement configuration subscription. A tree structure of a related configuration subscription data model (the tree structure may be obtained according to the international standards RFC 8340) shown in FIG. 4 or FIG. 5 is used as an example to describe a data management method provided in this embodiment of this application.

Figure 6:
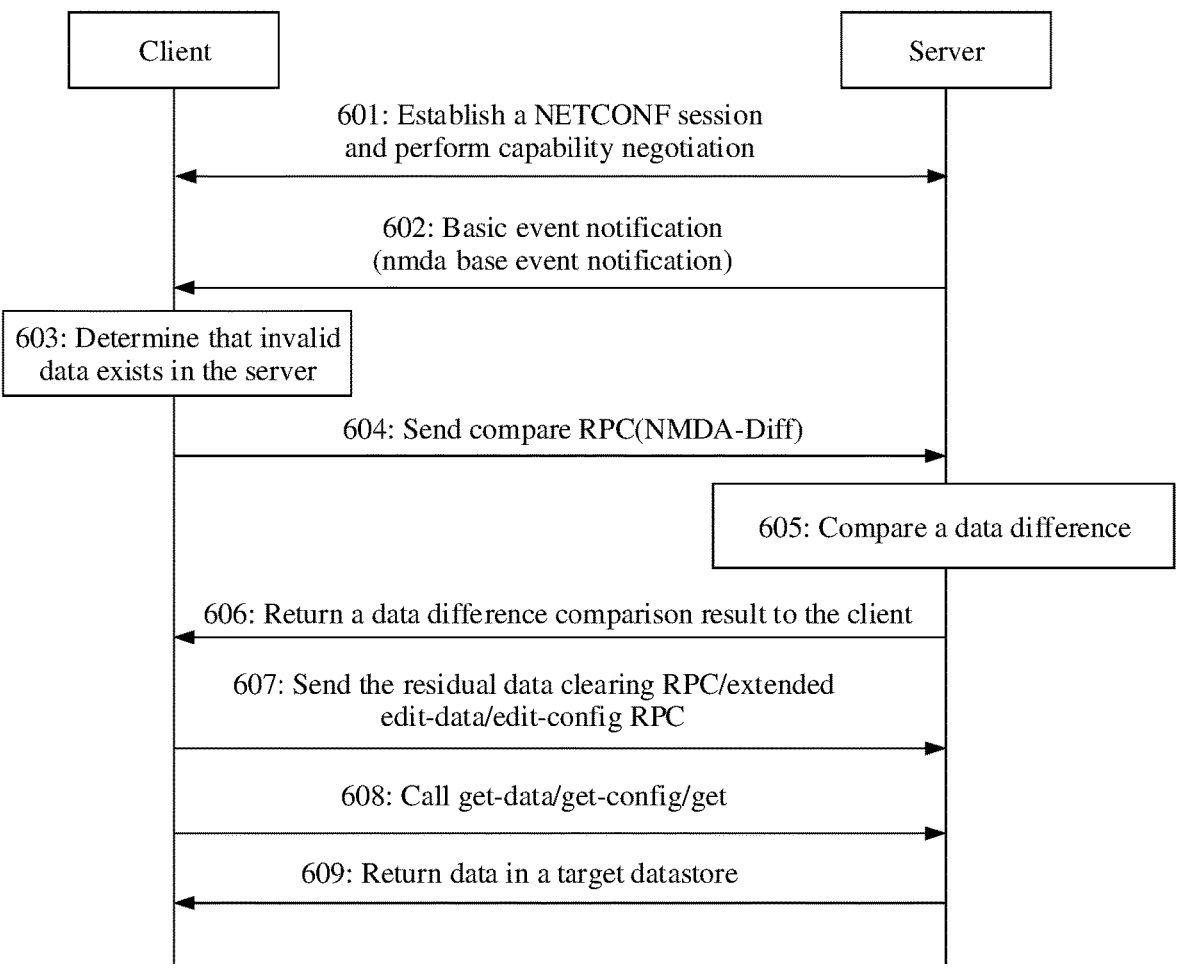
FIG. 6 is a schematic diagram of a data management process according to an embodiment of this application.

In an example embodiment, an interaction process between the client and the server shown in FIG. 6 is used as an example. The data management method provided in this embodiment of this application includes the following processes.

601: The client establishes a NETCONF/RESTCONF session with the server, and performs, based on the NETCONF/RESTCONF session, negotiation on a capability of clearing invalid residual data.

For example, the server sends a NETCONF/RESTCONF residual data clearing capability supported by the server to the client, to allow the client to use a residual data clearing function. The capability of clearing invalid residual data is defined as follows.

```
Netconf clear capability:
    urn:ietf:params:netconf:capability:clear-residual:1.0
Restconf clear capability:
    urn:ietf:params:restconf:capability:clear-residual:1.0
```

602: The server sends an nmda base event notification to the client.

603: The client receives the nmda base event notification sent by the server, and determines, based on the nmda base event notification, that invalid data exists in the server.

604: The client calls a compare RPC (NMDA-Diff) to trigger the server to perform data difference comparison.

605: The server compares a data difference between an <intended>/<running> datastore and an <operational> datastore based on the compare RPC (NMDA-Diff).

606: The server returns a data difference comparison result to the client.

For example, if the <intended>/<running> datastore has data that is not available in the <operational> datastore and the data is marked as non-effective residual data, it is determined that the data is residual data of FRUs or residual system configuration data. For example, the <running> datastore contains interface:et-o/o/o related data, the <operational> datastore does not have the related data, and interface:et-o/o/o in the <running> datastore is marked as invalid-residual. In this case, the data is identified as non-effective residual data, namely, target invalid data.

For example, the <running> datastore is as follows.

```
interfaces xmlns:or="urn:ietf:params:xml:ns:yang:ietf-origin"
        or:origin="cr:invalid-residual">
    <interface or:origin="cr:invalid-residual">
    <name>loo</name>
        <ip-address>i27.0.0.1</ip-address>
        </interface>
    </interfaces>
```

The <operational> datastore is as follows.

```
< interfaces >
    </interfaces>
```

607: Clear the invalid data in either of the following two manners.

Clearing manner 1: A first RPC called by the client is an RPC for clearing residual data, where the RPC for clearing residual data carries a target datastore that needs to be deleted, so that the server clears the residual data. The foregoing example in 606 is still used for description. The RPC for clearing residual data is called, in which the target datastore is set to <running>.

Call the clear-residual RPC, in which a target datastore target=<running> is entered. The RPC is as follows.

```
<rpc message-id="101"
        xmlns="urn:ietf:params:xml:ns:netconf-base:1.0"
    < clear-residual >
        <target>
            <running/>
        </target>
    </clear-residual >
    < /rpc>
```

For example, after the server clears the residual data, the method further includes a process of returning a clearing response. For example, based on the foregoing RPC for clearing residual data, after clearing the residual data, the server returns the following response.

```
<rpc-reply message-id="101"
        xmlns="urn:ietf:params:xml:ns:netconf-base:1.0"
    <ok/>
    </rpc-reply>
```

Clearing manner 2: A first RPC called by the client is an extended edit-data/edit-config RPC, where the extended edit-data/edit-config RPC carries a target datastore that needs to be deleted, so that the server clears the residual data.

The foregoing example in 607 is still used for description. Call the extended edit-data/edit-config RPC, in which a target datastore target=<running> is entered, and the clear-residual function is enabled by entering clear-residual=true. The extended edit-data/edit-config RPC is as follows.

```
<rpc message-id="101"
        xmlns="urn:ietf:params:xml:ns:netconf-base:1.0"
    <edit-data>
        <target>
            < running/>
        </target>
        <cr:clear-residual>true</cr:clear-residual >
    <edit-data>
    </rpc>
```

In addition, for example, the client may also add a new operation attribute, to be specific, clear-residual, to an "operation" attribute in a config element under edit-config/edit-data, to trigger the server to clear the residual data.

608: The client calls get-data/get-config/get to read data in the <running> datastore.

For example, after the data clearing operation is performed, the client calls get-data to read data in the <running> datastore to check whether the non-effective data, namely, the target invalid data, is cleared.

609: The server returns data in the target datastore, so that the client checks whether the residual data is cleared, in other words, whether the target invalid data is cleared.

For example, for the foregoing clearing manner 1, after the clearing operation is performed, get-data/get-config/get is called to read the data in the target datastore (the <running> datastore) in the previous step, and it is checked whether the residual data is cleared.

```
<rpc message-id="101"
        xmlns="urn:ietf:params:xml:ns:netconf-base:1.0"
    <get-data>
        <target>
            <running/>
        </target>
    </get-data>
    </rpc>
```

For example, the server returns the following response.

```
<rpc-reply message-id="101"
        xmlns="urn:ietf:params:xml:ns:netconf-base:1.0"
    <interface>
    </interface>
    </rpc-reply>
```

19

20

For the foregoing clearing manner 2, after the clearing operation is performed, get-data/get-config/get is called to read the data in the target datastore (the <running> datastore) in the previous step, and it is checked whether the residual data is cleared.

```
<rpc message-id="101"
      xmlns="urn:ietf:params:xml:ns:netconf-base:1.0"
   <get-data>
      <target>
         < running/>
      </target>
   </get-data>
</rpc>
```

For example, the server returns the following response.

```
<rpc-reply message-id="101"
      xmlns="urn:ietf:params:xml:ns:netconf-base:1.0"
   <interface>
   </interface>
</rpc-reply>
```

In the method provided in this embodiment of this application, when determining that invalid data exists, the server sends the base event notification nmda base event notification to the client, so that the client calls the compare RPC (NMDA-Diff) to trigger the server to perform data difference comparison. Further, the client determines the target invalid data based on the data difference comparison result, and calls the RPC for clearing invalid data, to clear the target invalid data, thereby saving device resources and improving operation and maintenance management efficiency.

Figures 7, 8:
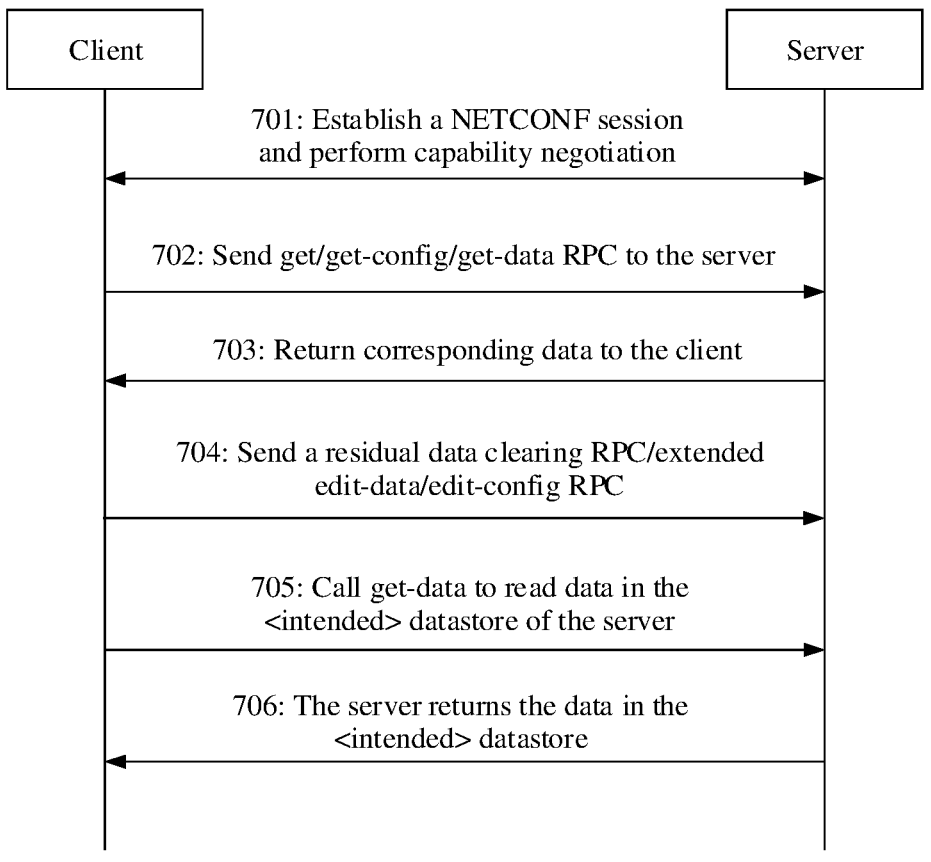
FIG. 7 is a schematic diagram of a data management process according to an embodiment of this application.
FIG. 8 is a schematic diagram of a tree structure of a configuration subscription data model according to an embodiment of this application.

In an example embodiment, an interaction process between the client and the server shown in FIG. 7 is used as an example. The data management method provided in this embodiment of this application includes the following processes.

701: The client establishes a NETCONF/RESTCONF session with the server, and performs, based on the NET-CONF/RESTCONF session, negotiation on a capability of clearing invalid residual data.

For example, the server sends a NETCONF/RESTCONF residual data clearing capability supported by the server to the client, to allow the client to use a residual data clearing function. The capability of clearing invalid residual data is defined as follows.

```
Netconf clear capability:
   urn:ietf:params:netconf:capability:clear-residual:1.0
Restconf clear capability:
   urn:ietf:params:restconf:capability:clear-residual:1.0
```

702: The client sends a get/get-config/get-data RPC to the server.

703: The server returns corresponding data to the client. If data in <intended>/<running> references data that does not exist, it is determined that the data is residual data of a leafref instance. For example.

```
< interface >
   <name>et-o/o/i</name>
   <name>et-o/o/2</name>
</interface >
<example-a>
```

-continued

```
      <interface>et-o/o/o</interface>
   </example-a>
```

It may be determined by using <interface>et-o/o/o</interface> that the referenced interface et-o/o/o does not exist. In this case, it is determined that <interface>et-o/o/o</interface> is the residual data of the leafref instance, namely, target invalid data.

In addition to the manners in 702 and 703, the server may further return an error identifier to the client, and indicate, by using the error identifier, that the referenced data has been deleted, in other words, second data referenced by first data has been deleted, so that the client determines the first data as the target invalid data.

704: Clear the residual data in a manner that includes but is not limited to the following two clearing manners.

Clearing manner 1: A first RPC called by the client is an RPC for clearing residual data, where the RPC for clearing residual data carries a target datastore and referenced data (referenced-object). The server clears the residual data, and all data that references the referenced-object is cleared. For example, the first RPC called is the RPC for clearing residual data, the target datastore is set to <intended>, and the referenced-object is set to interface/name=et-o/o/o. The server clears data that references interface/name=et-o/o/o.

For example, the first RPC called by the client is clear-residual, a target datastore target=running is entered, and referenced data (referenced-object) referenced-object=et-o/o/o is entered. The RPC is as follows, and the server clears the residual data accordingly.

```
<rpc message-id="101"
      xmlns="urn:ietf:params:xml:ns:netconf-base:1.0">
   <clear-residual >
      <target>
         <running/>
      </target>
      <referenced-object>../interface/name=et-o/o/o</referenced-object>
   </clear-residual >
</rpc>
```

Clearing manner 2: A first RPC called by the client is an extended edit-data RPC, where the extended edit-data RPC carries a target datastore that needs to be deleted and referenced data (referenced-object), and in which the residual data clearing function is enabled. When the server clears the residual data, all data that references the referenced-object is cleared. In the preceding example, the extended edit-data RPC is called, the target datastore is set to <intended>, the clear-residual function is enabled, and the referenced-object is set to interface/name=et-o/o/o.

For another example, the extended edit-data RPC is called, a target datastore target=running is entered, and referenced data (referenced-object) referenced-object=et-o/o/o is entered. The extended edit-data RPC is as follows, and the server clears the residual data accordingly.

```
<rpc message-id="101"
      xmlns="urn:ietf:params:xml:ns:netconf-base:1.0"
   <edit-data>
      <target>
         <running/>
      </target>
      <cr:clear-residual>true</ cr:clear-residual >
```

-continued

```
    <cr:referenced-object>../interface/name=et-0/0/0</cr:referenced-object>
    </ edit-data >
</rpc>
```

705: After the clearing operation is performed, the client calls get-data to read data in the <intended> datastore of the server.

706: The server returns the data in the <intended> datastore, so that the client checks whether the residual data is cleared.

For example, after the clearing operation is performed, the client calls get-data to read the data in the <intended> datastore, to check whether the residual data is cleared. The get-data is as follows.

```
    <rpc message-id="101"
        xmlns="urn:ietf:params:xml:ns:netconf-base:1.0"
        <get-data>
            <target>
                < running/>
            </target>
        </get-data>
    </rpc>
```

The response returned by the server is as follows.

```
    <rpc-reply message-id="101"
        xmlns="urn:ietf:params:xml:ns:netconf-base:1.0"
        <interface>
            <name>et-0/0/1</name>
            <name>et-0/0/2</name>
        </interface>
        <example-a>
        </example-a>
    </rpc-reply>
```

In the method provided in this embodiment of this application, the client actively reads data on the server, and when determining, based on a reading result, that invalid data exists, the client calls an RPC for clearing invalid data to clear the invalid data, thereby saving device resources and improving operation and maintenance management efficiency. In addition, when the invalid data is cleared, because the method provided in this embodiment of this application further supports deletion of other data that references the invalid data, the device resources may be further saved, and the operation and maintenance management efficiency may be improved.

In addition to the manner shown in FIG. 6 or FIG. 7, the method provided in this embodiment of this application further supports calling of a forced deletion RPC to delete data in a specified data structure (a datastore) and all data that references the data. An example in which the first network device functions as a client, the second network device functions as a server, and a YANG data model is defined in the client and the server is still used to describe a subscription data flow type and a subscription event type, to implement configuration subscription. An example in which a tree structure of a related configuration subscription data model (the tree structure may be obtained according to the international standards RFC 8340) is a tree structure of a configuration subscription model shown in FIG. 8 or FIG. 9 is used to describe a data management method provided in this embodiment of this application.

Figures 9, 10:
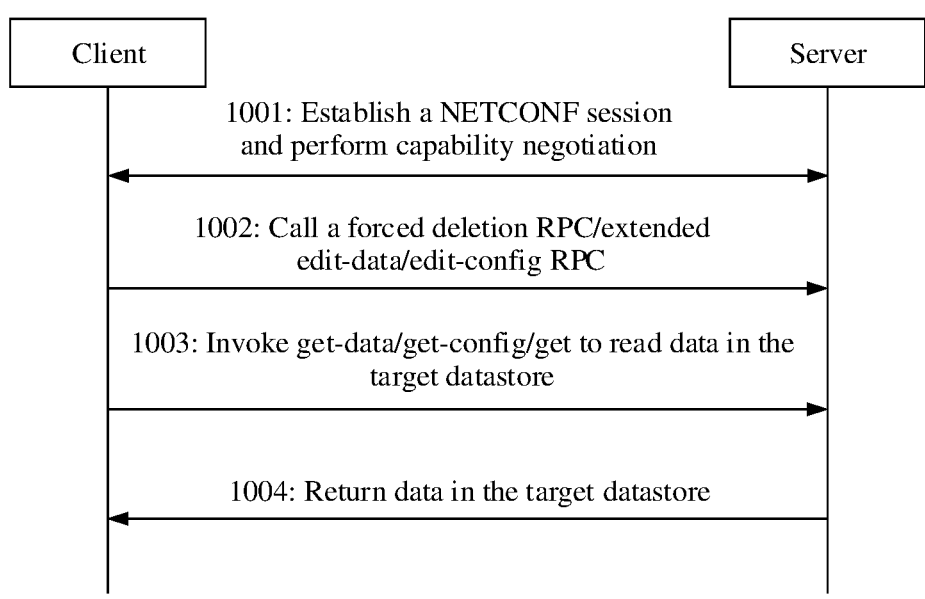
FIG. 9 is a schematic diagram of a tree structure of a configuration subscription data model according to an embodiment of this application.
FIG. 10 is a schematic diagram of a data management process according to an embodiment of this application.

In an example embodiment, an interaction process between the client and the server shown in FIG. 10 is used as an example. The data management method provided in this embodiment of this application includes the following processes.

1001: The server establishes a NETCONF/RESTCONF session with the client, and performs negotiation on a supported capability of clearing invalid residual data. The server sends a NETCONF/RESTCONF residual data clearing capability supported by the server to the client, to allow the client to use a residual data clearing function. The capability is defined as follows.

```
    Netconf clear capability:
        urn:ietf:params:netconf:capability:clear-residual:1.0
    Restconf clear capability:
        urn:ietf:params:restconf:capability:clear-residual:1.0
```

1002: The client calls a first RPC, which is a forced deletion RPC, to delete data in a specified datastore and all node instances that reference the data. Alternatively, an original edit-data RPC of the netconf is extended, and a forced-delete operation is added to an extended edit-data RPC.

For example, a <running> datastore contains three interfaces (et-o/o/o, et-o/o/1, and rt-o/o/2) and example-a that references the interface et-o/o/o.

```
    <interface>
        <name>et-0/0/0</name>
        <name>et-0/0/1</name>
        <name>et-0/0/2</name>
    </interface>
    <example-a>
        <interface>et-0/0/0</interface>
    </example-a>
```

To delete the interface et-o/o/o and all data that references the interface et-o/o/o at a time, a forced-delete RPC is called, in which a target datastore datastore=running is entered, and a node target=interface[name="et-o/o/o" is deleted. The RPC is as follows.

```
    <rpc message-id="101"
        xmlns="urn:ietf:params:xml:ns:netconf-base:1.0"
        <forced-delete>
            <target>
                <running/>
            </target>
            <target>interface[name="et-0/0/0"]</target>
        </ forced-delete >
    </rpc>
```

It should be noted that, in this embodiment of this application, information that is carried in the forced deletion RPC and that is about data that needs to be deleted is not limited, and a manner of determining the information is either not limited. For example, the information may be determined by using manner 1 and manner 3 in 301 shown in FIG. 3, or may be manually set.

1003: After the server performs a clearing operation, the client calls get-data/get-config/get to read data in the target datastore and checks whether the data is cleared. For example, the target datastore is <running>.

```
<rpc message-id="101"
    xmlns="urn:ietf:params:xml:ns:netconf-base:1.0">
  <get-data>
    <target>
      <running/>
    </target>
  </get-target>
</rpc>
```

1004: The server returns data in the target datastore, which is as follows.

```
<rpc-reply message-id="101"
    xmlns="urn:ietf:params:xml:ns:netconf-base:1.0">
  <interface>
    <name>et-0/0/1</name>
    <name>et-0/0/2</name>
  </interface>
  <example-a>
  </example-a>
</rpc-reply>
```

In the method provided in this embodiment of this application, the client actively reads data on the server, and when determining, based on a reading result, that invalid data exists, the client calls an RPC for clearing invalid data to clear the invalid data, thereby saving device resources and improving operation and maintenance management efficiency. In addition, when the invalid data is cleared, because the method provided in this embodiment of this application further supports deletion of other data that references the invalid data, the device resources may be further saved, and the operation and maintenance management efficiency may be improved.

In addition to the foregoing data management manner, in an example embodiment, the method provided in this embodiment of this application may be further applied to a YANG model. The YANG model is a data modeling language used to model configuration data, state data, remote procedure calls, and notifications used by a network configuration management protocol. The YANG model models a hierarchy of data as a tree, in which each node has a name, and each node has a value or a set of child nodes. The YANG model provides clear and concise descriptions of the nodes, as well as interaction between the nodes. In addition, the YANG model structures data models into modules and submodules. A module can import data from another external module and can include data from a submodule. Based on the data model, the hierarchy of data can be augmented, allowing one module to add a data node to a hierarchy defined in another module.

Hierarchy augmentation may be conditional, with a new node appearing only if a specific condition is met. For example, a leaf node in a current model or another model is referenced by using a built-in type leafref in the YANG model, where a reference purpose implies a requirement for checking data validity. A value of a valid leafref cannot be null or empty. The leafref cannot point to a column that has been deleted or renamed. A system automatically checks validity of the leafref. The built-in type leafref in the YANG model is restricted to value space of a leaf node or a leaf-list node in a schema tree and optionally further restricted by a corresponding instance node in a data tree. Value space of a referring node is value space of a referred node.

In addition, the YANG model includes a require-instance statement, where the require-instance statement is a substatement of a type statement. The require-instance statement may exist if the type is instance-identifier or leafref. In addition, the require-instance statement takes true or false as an argument. If the statement is not defined, the statement defaults to true.

If require-instance is true, it means that a referenced instance must exist in valid data. If require-instance is false, it means that a referenced instance may exist in valid data. In yang1.0 and yang1.1, a keyword of the built-in type leafref is used to state a leaf instance reference. In yang1.1, a require-instance statement identifier is introduced to identify a dangling reference.

When require-instance is true, it means that a referenced instance must exist in valid data. However, in an existing service, a referred node is not aware of a referring node. When the referred node is deleted, the referring node becomes dangling and configuration fails. However, for a scenario in which a resource configuration is referenced, associative processing needs to be strictly performed. An interface is used as an example. When the interface is referenced, existence of the interface needs to be strictly checked. After configuration is successful, if the interface is deleted, the reference configuration should also be deleted synchronously. Further, in some example embodiments, when the referred node is deleted, the system reports error information when the referring node performs a netconf operation. Therefore, an associative deletion function needs to be implemented in a service scenario. In other words, when the referred node is deleted, the referring node can be automatically and associatively deleted.

In a related technology, the referring nodes first need to be manually deleted in sequence, to release a reference relationship between the referred node and the referring nodes. The referred node can be deleted only after all the referring nodes are deleted. As a result, associative deletion causes heavy workload and low performance. In addition to manual deletion, the related technology further provides a manner in which false is returned for a when expression xpath, to implement associative deletion. However, it is complex to construct the when conditional expression xpath and a huge amount of computation is required to parse xpath. In addition, in the current service scenario, many references between YANG modules need to be involved, which has high requirements on writing the when expression xpath.

Based on an urgent requirement of associative deletion, to effectively avoid a dangling reference, the data management method provided in this embodiment of this application supports automatic associative deletion of invalid data by using an extended YANG model statement. With this method, not only a description of an associative deletion behavior can be provided, but also an objective of associative deletion of the referring node can be achieved when the referred node is deleted. Compared with manual deletion, the data management method provided in this embodiment of this application delivers higher efficiency. Compared with construction of the when conditional expression, the method provided in this embodiment of this application has better controllability, a smaller consumed computation amount, and simpler and more intuitive configuration.

For example, in this embodiment of this application, the target invalid data involved in FIG. 3 may be data corresponding to the referred node. If a data model in which the referring node corresponding to the referred node is located includes an extended first statement, and the first statement is used to indicate to delete the target invalid data, data corresponding to the referring node is automatically and associatively deleted. In this case, after the second network device deletes the target invalid data based on the first RPC, the second network device automatically and associatively deletes, based on the first statement, the data corresponding to the referring node.

An example in which the YANG model is huawei-ext.yang is used. A first statement is extended by using a YANG extension keyword extension statement. For example, the first statement is an auto-del-ref statement, in which true or false is used as an argument. If the statement is not defined, the statement defaults to false. When auto-del-ref is true, the referring node needs to be associatively deleted when the referred node is deleted. When auto-del-ref is set to false, the referring node does not need to be associatively deleted when the referred node is deleted. For example, huawei-ext.yang is as follows.

```
huawei-ext.yang
extension auto-del-ref {
    argument name {
        bool true;
    }
}
```

For ease of understanding, the following referring node and referred node are used as examples for description.

| Referred node | Referring node |
|---|---|
| list interface {<br>    key "name";<br>    leaf name {<br>        type string;<br>    }<br>    list address {<br>        key "ip";<br>        leaf ip{<br>            type yang:ip-address;<br>        }<br>    }<br>} | container rip {<br>    list network-ifname {<br>        key ifname;<br>        leaf ifname {<br>            type leafref {<br>                path "/interface/name";<br>                require-instance true;<br>            }<br>        }<br>    }<br>} |

First, for a yang model that needs to state enabling of an associative node deletion behavior, huawei-ext.yang needs to be introduced to the .yang model in an import manner. The following uses ydb-test-common.yang as an example.

```
module ydb-test-common {
    yang-version 1.1;
    namespace "urn:huawei:ydb:ydb-test-common";
    prefix ydb-common;
    import huawei-ext {
        prefix "ext";
    }
    list interface {
        key "name";
        leaf name {
            type leafref {
                path "/interface/name";
            }
        }
    }
    list address {
        key "ip";
        leaf ip {
            type yang:ip-address;
        }
    }
}
```

Second, in ydb-test-common.yang, a value of a leaf node references a value of a leaf node name of interface by using the built-in type leafref, and when the require-instance statement with value set to true does not support a dangling reference, the node imports an auto-del-ref statement whose value is set to true. To implement the statement about the associative deletion behavior, ydb-test-common.yang is as follows.

```
module ydb-test-common {
    yang-version 1.1;
    namespace "urn:huawei:ydb:ydb-test-common";
    prefix ydb-common;
    import huawei-ext {
        prefix "ext";
    }
    list interface {
        key "name";
        leaf name {
            type leafref {
                path "/interface/name";
                require-instance true;
                auto-del-ref true;
            }
        }
    }
    list address {
        key "ip";
        leaf ip {
            type yang:ip-address;
        }
    }
}
```

When the referring node/interface/name to which path points is deleted, because the value of auto-del-ref that has been stated under the leaf node name in the foregoing ydb-test-common.yang is true, associative deletion of the leaf node name in ydb-test-common.yang is implemented. After the deletion, ydb-test-common.yang is as follows.

```
module ydb-test-common {
    yang-version 1.1;
    namespace "urn:huawei:ydb:ydb-test-common";
    prefix ydb-common;
    import huawei-ext {
        prefix "ext";
    }
    list address {
        key "ip";
        leaf ip {
            type yang:ip-address;
        }
    }
}
```

In the foregoing embodiment, the referred node and the referring node are in a one-to-one reference. In an actual service scenario, a reference relationship is relatively complex, a reference scale between nodes is relatively large, and one node may be referenced by hundreds or thousands of nodes. The following two scenarios are described based on analysis description in a scenario where a referred node and referring nodes are in a one-to-multiple reference.

Scenario 1: A node corresponding to deleted invalid data is referenced by a plurality of nodes.

Figure 11:
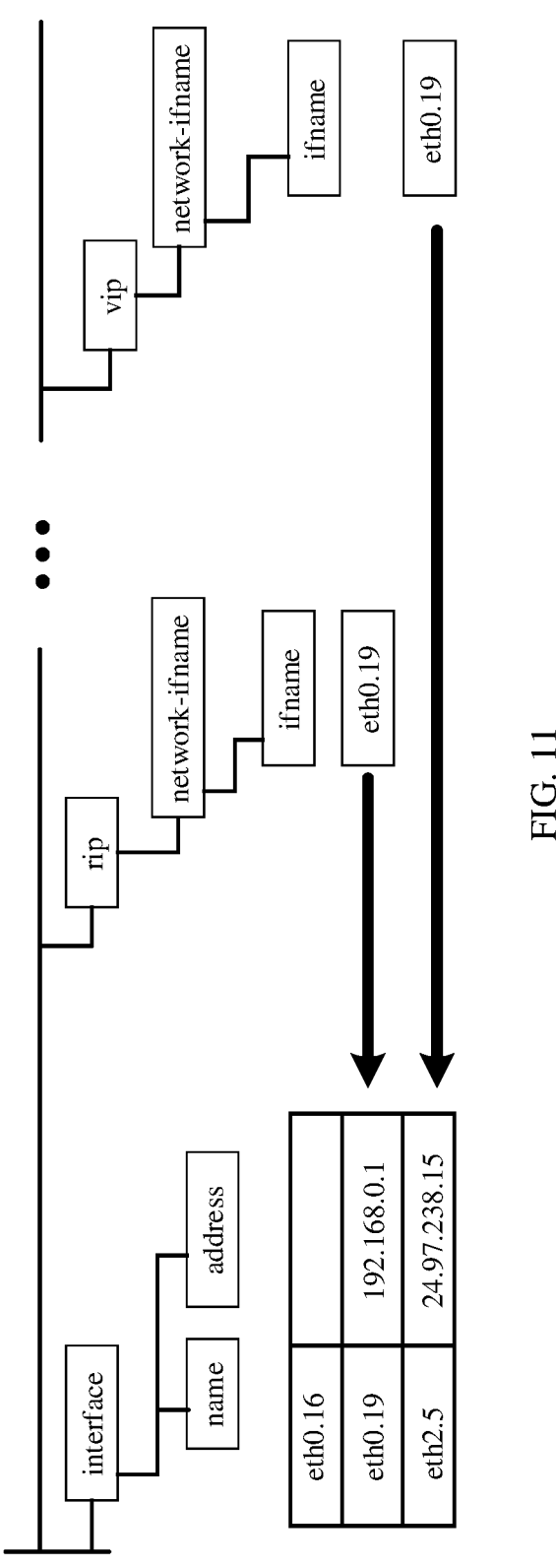
FIG. 11 is a schematic diagram of a data structure according to an embodiment of this application.

As shown in FIG. 11, a leaf node name of interface is referenced by a plurality of nodes such as a leaf node ifname of rip and a leaf node ifname of vip. In this embodiment of this application, rip and other nodes such as vip are understood to be equivalent, and rip is used as an example for description.

First, the huawei-ext.yang file defined in this embodiment of this application is introduced to rip-test-common.yang by importing huawei-ext. The following rip-test-common.yang is used as an example.

```
module rip-test-common {
    yang-version 1.1;
    namespace "urn:huawei:ydb:ydb-test-common";
    prefix ydb-common;
    import huawei-ext {
        prefix "ext";
    }
    container rip {
        list network-ifname {
            key ifname;
            leaf ifname {
                type leafref {
                    path "/interface/name";
                }
            }
        }
    }
}
```

Second, the leaf node ifname under a leaf-list node network-ifname of the container node rip states a non-dangling reference by using a statement in which require-instance is true. A yang syntax used by the rip node to state associative deletion is as follows.

```
module rip-test-common {
    yang-version 1.1;
    namespace "urn:huawei:ydb:ydb-test-common";
    prefix ydb-common;
    import huawei-ext {
        prefix "ext";
    }
    container rip {
        list network-ifname {
            key ifname;
            leaf ifname {
                type leafref {
                    path "/interface/name";
                    require-instance true;
                    hw-ext:auto-del-ref true;
                }
            }
        }
    }}
```

When a string value/interface/name pointed to by path is deleted, a non-dangling reference is stated by using a statement in which require-instance is true. In this way, the leaf node ifname under the rip container is associatively deleted.

```
module rip-test-common {
    yang-version 1.1;
    namespace "urn:huawei:ydb:ydb-test-common";
    prefix ydb-common;
    import huawei-ext {
        prefix "ext";
    }
}
```

Similarly, a value of the leaf node ifname under a leaf-list node network-ifname of the container node vip may be associatively deleted by performing the foregoing step. Details are not described again herein.

Scenario 2: A node corresponding to deleted invalid data is a referring node as well as a referred node.

Figure 12:
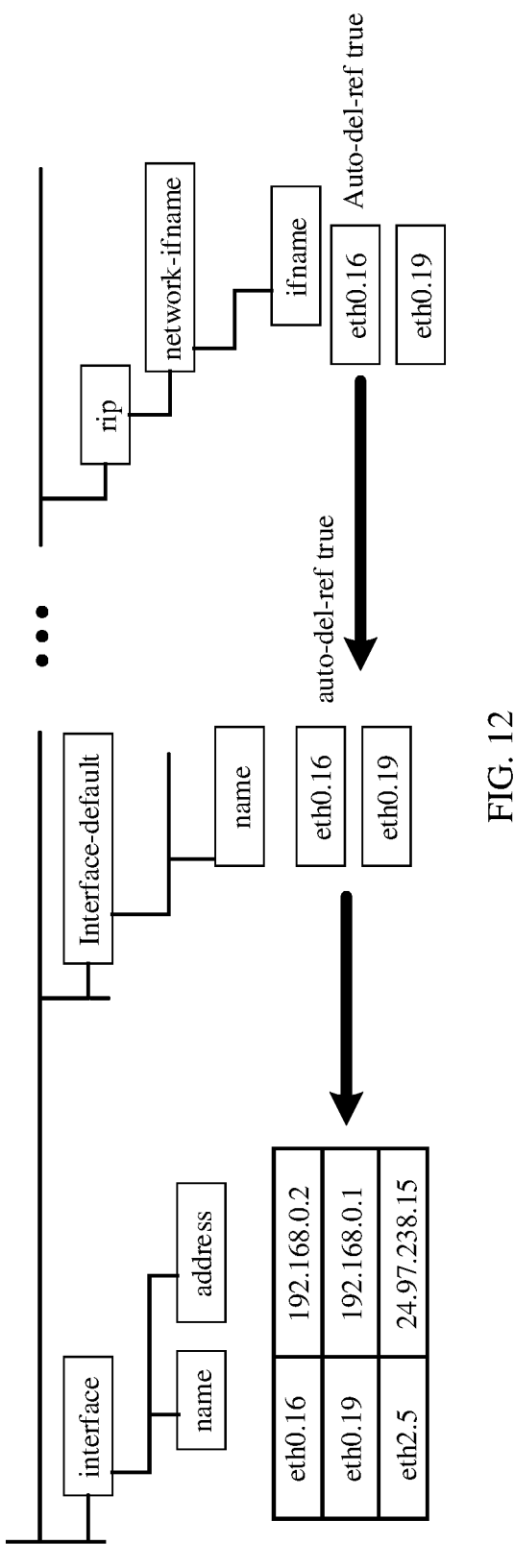
FIG. 12 is a schematic diagram of a data structure according to an embodiment of this application.

As shown in FIG. 12, an interface-default node is a value of a referred node relative to a rip node, and the interface-default node also references a value of an interface node. For example, a model structure of interface-default is as follows.

```
Augment /sys:system/sys:interface-dafault {
    container interface-dafault {
        leaf name {
            type leafref {
                path "/interface/name";
            }
        }
    }
}
```

For example, a model structure of the container node rip is as follows.

```
Augment /sys:system/sys:rip {
    container rip {
        list network-ifname {
            key ifname;
            leaf ifname {
                type leafref {
                    path "/interface/name";
                }
            }
        }
    }
}
```

If the leaf node name of interface-default and the leaf node ifname under a leaf-list node network-ifname of the container node rip both reference hw-ext:auto-del-ref, the value is set to true. A model structure of interface-default that references a statement is as follows.

```
Augment /sys:system/sys:interface-dafault {
    container interface-dafault {
        leaf name {
            type leafref {
                path "/interface/name";
                require-instance true;
                hw-ext:auto-del-ref true;
            }
        }
    }
}
```

For example, a model structure of the container node rip that references a statement is as follows.

```
Augment /sys:system/sys:rip {
    container rip {
        list network-ifname {
            key ifname;
            leaf ifname {
                type leafref {
                    path "/interface/name";
                    require-instance true;
                    hw-ext:auto-del-ref true;
                }
            }
        }
    }
}
```

Figure 13:
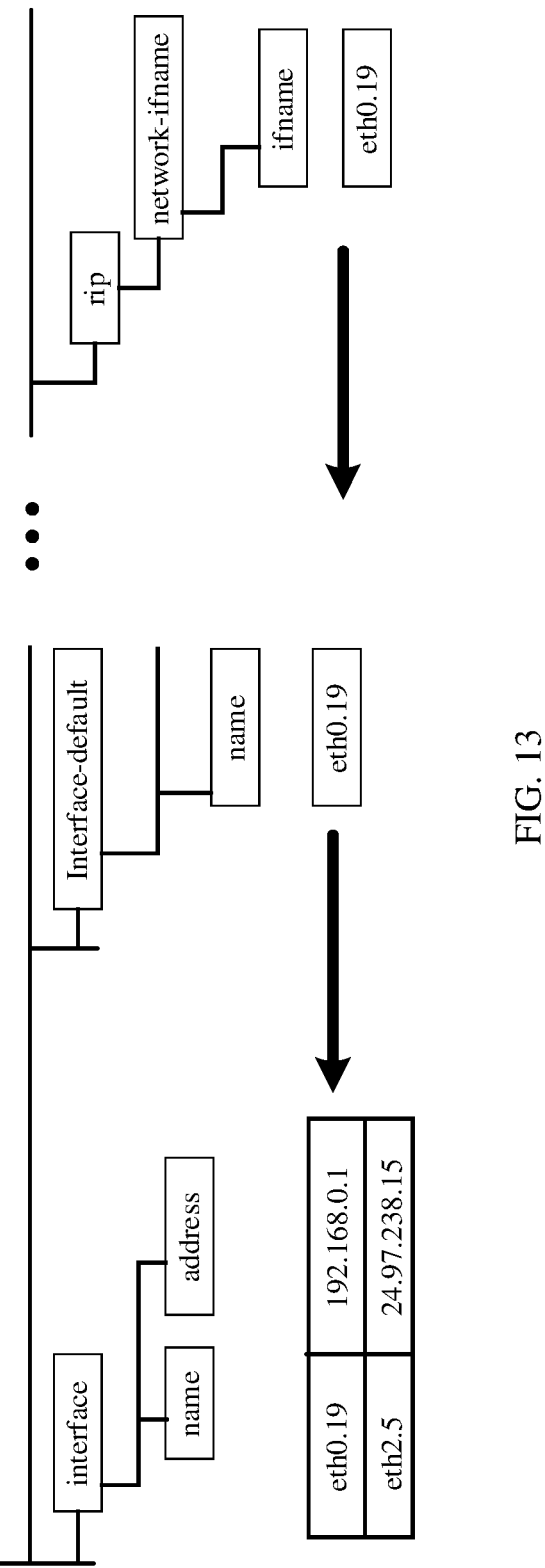
FIG. 13 is a schematic diagram of a data structure according to an embodiment of this application.

When eth0.16 of the container interface-default/name is deleted, the leaf node ifname of rip is also associatively deleted. Then, interface-default/name traces a leaf node name of interface referenced by interface-default/name. When eth0.16 of the leaf node name of interface is deleted, eth0.16 of the leaf node name of interface-default is also associatively deleted. A structure after deletion is shown in FIG. 13.

Based on another service requirement, when a referred node is deleted, all nodes that reference the node need to be deleted. The data management method provided in this embodiment of this application supports automatic associative deletion of invalid data by using an extended YANG model statement. For example, in this embodiment of this application, target invalid data is data corresponding to the referred node. When a data structure in which the target invalid data is located includes an extended second statement, and the second statement is used to indicate to delete the target invalid data, data corresponding to all referring nodes is associatively deleted. In this case, after the second network device deletes the target invalid data based on the first RPC, the method further includes that the second network device associatively deletes, based on the second statement, the data corresponding to all the referring nodes.

A YANG 1.1 model in RFC 7950 is used as an example. A second statement is extended by extending a keyword extension statement in the huawei-ext.yang file. For example, the second statement is a full-ref-del statement, in which true or false is used as an argument. If the statement is not defined, the statement defaults to false. If full-ref-del is true, it means that all nodes that reference a referred node need to be associatively deleted when the referred node is deleted. If full-ref-del is false, it means that all nodes that reference a referred node do not need to be associatively deleted when the referred node is deleted. For example, huawei-ext.yang is as follows.

```
                    huawei-ext.yang
                    extension full-ref-del {
                      argument name {
                        bool true;
                      }
                    }
```

For ease of understanding, the following referring node and referred node are used as examples for description.

| Referred node | Referring node |
|---|---|
| list interface { <br>   key "name"; <br>   leaf name { <br>     type string; <br>   } <br>   list address { <br>     key "ip"; <br>     leaf ip{ <br>       type yang:ip-address; <br>     } <br>   } <br> } | container rip { <br>   list network-ifname { <br>     key ifname; <br>     leaf ifname { <br>       type leafref { <br>         path "/interface/name"; <br>         require-instance true; <br>       } <br>     } <br> } |

First, huawei-ext.yang is introduced in an import manner to a .yang model that needs to state full-associative node deletion. The following ydb-test-common.yang is used as an example.

```
                 module ydb-test-common {
                   yang-version 1.1;
                   namespace "urn:huawei:ydb:ydb-test-common";
                   prefix ydb-common;
                   import huawei-ext {
                     prefix "ext";
                   }
                   list address {
                     key "ip";
```

```
                       leaf ip {
                         type yangfip-address;
                       }
                     }
                   }
                 }
```

Second, in ydb-test-common.yang, a value of a leaf node name of a referring node rip references a value of a leaf node name of interface by using the built-in type leafref, and when the require-instance statement with value set to true does not support a dangling reference, the leaf node of the referred node interface imports a hw-ext:full-ref-del statement whose value is set to true. The statement about the behavior of associatively deleting all the referring nodes is implemented.

For example, ydb-test-common.yang with the hw-ext: full-ref-del statement added is as follows.

```
               module ydb-test-common {
                 yang-version 1.1;
                 namespace "urn:huawei:ydb:ydb-test-common";
                 prefix ydb-common;
                 import huawei-ext {
                     prefix "ext";
                 }
                 list interface {
                     key "name";
                     leaf name {
                         type string;
                         hw-ext:full-ref-del true;
                     }
                 }
                 list address {
                     key "ip";
                     leaf ip {
                         type yangfip-address;
                     }
                 }
               }
```

Then, when the referred node/interface/name is deleted, because the value of hw-ext:full-ref-del that is stated under the leaf node name in ydb-test-common.yang is true, all the nodes that reference/interface/name may be deleted.

```
               module ydb-test-common {
                 yang-version 1.1;
                 namespace "urn:huawei:ydb:ydb-test-common";
                 prefix ydb-common;
                 import huawei-ext {
                     prefix "ext";
                 }
                 list address {
                     key "ip";
                     leaf ip {
                         type yangfip-address;
                     }
                 }
               }
```

Figure 14:
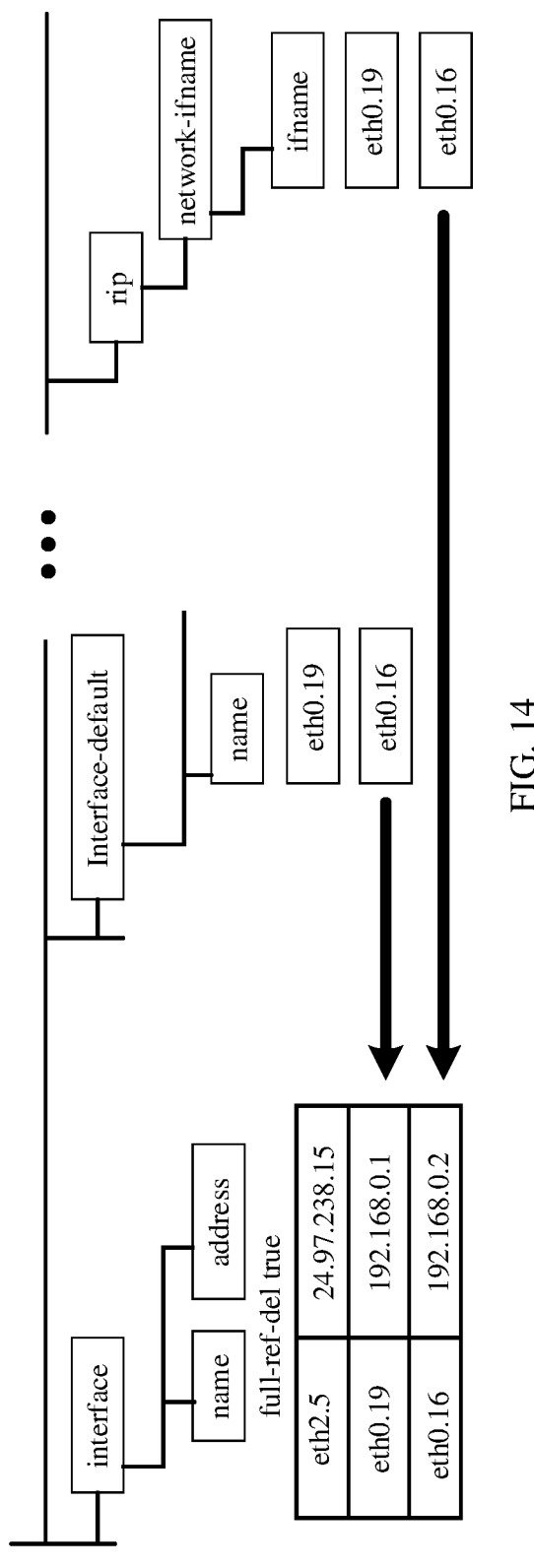
FIG. 14 is a schematic diagram of a data structure according to an embodiment of this application.

In a service scenario, a reference scale between nodes is relatively large, and one node usually may be referenced by hundreds or thousands of nodes. When the service needs to delete a referred node, all referring nodes that reference the node need to be deleted. The following describes, from a perspective of being referenced, the data management method provided in this embodiment of this application. As shown in FIG. 14, a leaf node name of interface is referenced by a plurality of nodes such as a leaf node name of interface-default and a leaf node ifname of rip. When the leaf node name of interface is deleted, other nodes such as rip and interface-default are associatively deleted.

The leaf node name of interface-default is equivalent to the leaf node ifname of rip. This embodiment uses rip as an example. In the scenario shown in FIG. 14, the referred node interface/name and the referring nodes interface-default/name and rip/ifname are in a one-to-multiple reference. When the leaf node name of interface requires that all nodes that reference the leaf node name of interface be deleted by one click, in other words, all the referring nodes are associatively deleted, the procedure in which rip is used as an example is as follows.

First, for a yang model that needs to state enabling of a full-associative node deletion behavior, huawei-ext.yang needs to be first introduced to the .yang model in an import manner. The following uses the referred node interface and the referring node rip as examples. For example, the referred node interface is as follows.

```
Augment /sys:system/sys: interface {
    import huawei-ext {
        prefix "ext";
    }
    list interface {
        key "name";
        leaf name {
            type string;
        }
    }
    list address {
        key "ip";
        leaf ip {
            type yang:ip-address;
        }
    }
}
```

A model structure of the referring node rip is as follows.

```
Augment /sys:system/sys:rip {
    container rip {
        list network-ifname {
            key ifname;
            leaf ifname {
                type leafref {
                    path "/interface/name";
                }
            }
        }
    }
}
```

Second, in rip, a value of a leaf node ifname references a value of interface/name by using the built-in type leafref, and when the require-instance statement with value set to true does not support a dangling reference, the leaf node name of interface imports a hw-ext:full-ref-del statement whose value is set to true, thereby implementing the statement about the behavior of associatively deleting all the referring nodes. A model structure of interface that is added with a statement is as follows.

```
Augment /sys:system/sys: interface {
    import huawei-ext {
        prefix "ext";
    }
    list interface {
        key "name";
```

-continued

```
        leaf name {
            type string;
            hw-ext:full-ref-del true;
        }
        list address {
            key "ip";
            leaf ip {
                type yang:ip-address;
            }
        }
    }
}
Augment /sys:system/sys:rip {
    container rip {
        list network-ifname {
            key ifname;
            leaf ifname {
                type leafref {
                    path "/interface/name";
                    require-instance true;
                }
            }
        }
    }
}
```

Figure 15:
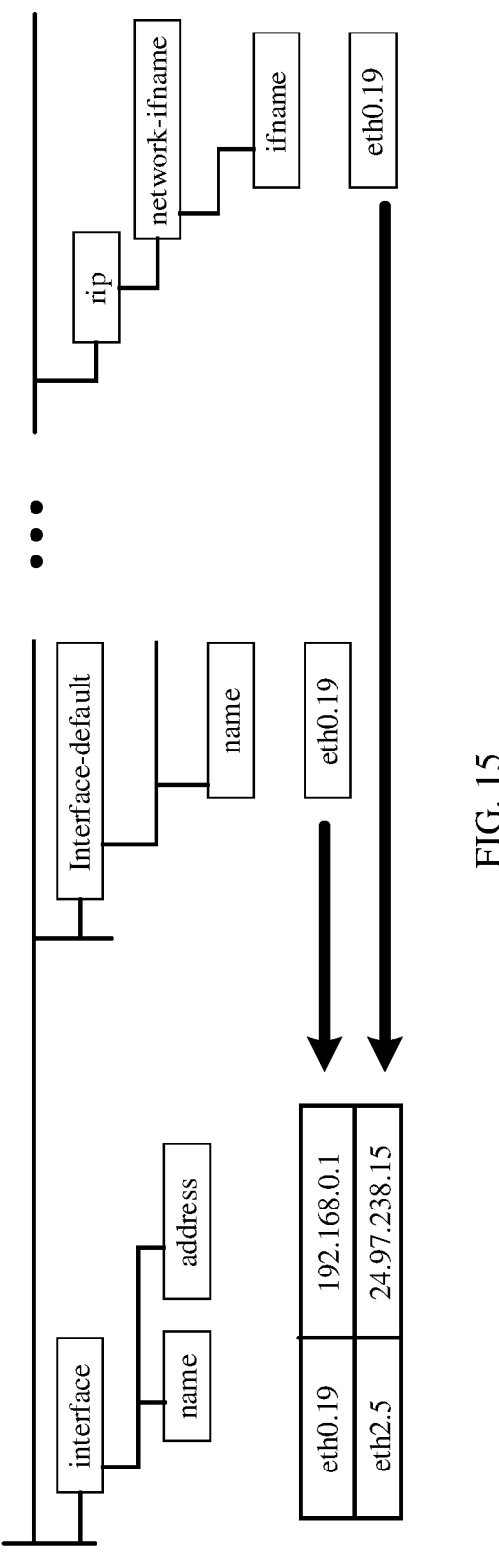
FIG. 15 is a schematic diagram of a data structure according to an embodiment of this application.

When the referred node/interface/name eth0.16 192.168.0.2 is deleted, because the value of hw-ext:full-ref-del that is stated under name is true, all nodes that reference the node itself may be deleted, and/interface/name referenced by the leaf node name of interface-default and the leaf node ifname of rip may be deleted. A deletion result is shown in FIG. 15.

In conclusion, the data management method provided in this embodiment of this application not only provides a description of an automatic associative deletion behavior and a description of an automatic full-associative deletion behavior, but also implements an objective of associatively deleting the referring node when the referred node is deleted. In an associative verification scenario, data inconsistency is effectively reduced to avoid a dangling reference, and a computation amount is reduced to improve automatic associative deletion performance. In addition, the method provided in this embodiment of this application is intuitively configured and is easy to use.

Figure 16:
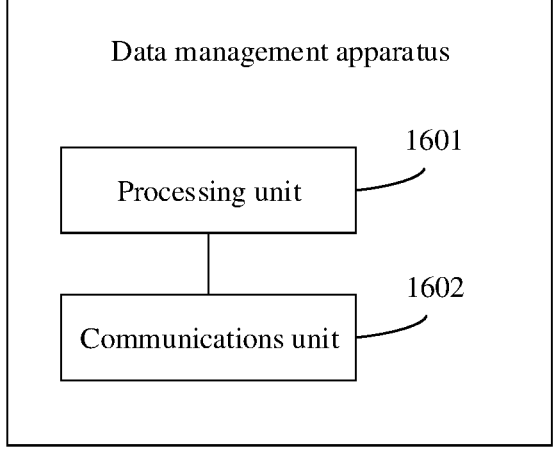
FIG. 16 is a schematic diagram of a structure of a data management apparatus according to an embodiment of this application.

An embodiment of this application provides a data management apparatus. Refer to FIG. 16. The apparatus is configured to perform the method performed by the foregoing first network device, for example, a client, and the apparatus includes a processing unit 1601, configured to determine target invalid data existing in a second network device and obtain a first RPC, where the first RPC carries information about target invalid data that needs to be deleted, and a communications unit 1602, configured to send the first RPC to the second network device, where the first RPC is used to indicate the second network device to delete the target invalid data.

In an example embodiment, the communications unit 1602 is configured to send a second RPC to the second network device, where the second RPC is used to indicate the second network device to perform data difference comparison, and receive a data difference comparison result returned by the second network device.

The processing unit 16oi is configured to determine, based on the difference comparison result, the target invalid data existing in the second network device.

In an example embodiment, the communications unit 1602 is further configured to receive a base event notification sent by the second network device, where the base event notification is used to indicate that invalid data exists in the second network device.

The processing unit 16*oi* is further configured to determine, based on the base event notification, that invalid data exists in the second network device, and trigger the communications unit to perform an operation of sending the second RPC to the second network device.

In an example embodiment, the communications unit 1602 is configured to send a third RPC to the second network device, where the third RPC is used to indicate the second network device to return first data, and receive the first data returned by the second network device.

The processing unit 16*oi* is configured to, based on a response that second data referenced by the first data does not exist, determine that the first data is the target invalid data existing in the second network device.

In an example embodiment, the communications unit 1602 is configured to send the third RPC to the second network device, where the third RPC is used to indicate the second network device to return the first data, and receive an error identifier returned by the second network device, where the error identifier indicates that the second data referenced by the first data has been deleted.

The processing unit 16*oi* is configured to determine, based on the error identifier, the first data as the target invalid data existing in the second network device.

In an example embodiment, the communications unit 1602 is further configured to establish a network configuration session with the second network device, and receive, based on the network configuration session, a residual network configuration data clearing capability that is sent by the second network device and that is supported by the second network device.

In an example embodiment, the first RPC is a new RPC, where an input argument of the new RPC includes the information about the target invalid data that needs to be deleted.

Alternatively, the first RPC is an extended RPC obtained by extending an existing RPC, and the extended RPC carries the information about the target invalid data that needs to be deleted.

In an example embodiment, the communications unit 1602 is further configured to read the target invalid data in the second network device.

The processing unit 16*oi* is further configured to verify, based on a reading result of the communications unit, whether the target invalid data is cleared.

In an example embodiment, the target invalid data is data corresponding to a referred node, and a data model in which a referring node corresponding to the referred node is located includes an extended first statement, where the first statement is used to indicate to automatically and associatively delete data corresponding to the referring node when the target invalid data is deleted.

In an example embodiment, the target invalid data is data corresponding to a referred node, and a data model in which the target invalid data is located includes an extended second statement, where the second statement is used to indicate to associatively delete data corresponding to all referring nodes when the target invalid data is deleted.

In the method provided in this embodiment of this application, invalid data is determined, and an RPC for clearing invalid data is called to clear the invalid data, thereby saving device resources and improving operation and maintenance management efficiency. In addition, when the invalid data is cleared, because the method provided in this embodiment of this application further supports deletion of other data that references the invalid data, the device resources may be further saved, and the operation and maintenance management efficiency may be improved.

Figure 17:
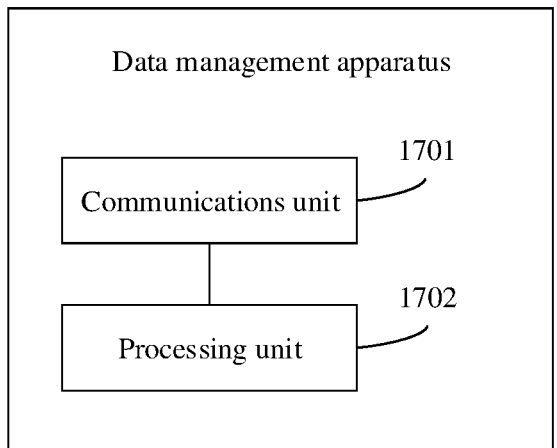
FIG. 17 is a schematic diagram of a structure of a data management apparatus according to an embodiment of this application.

An embodiment of this application provides a data management apparatus. Refer to FIG. 17. The apparatus is configured to perform the method performed by the foregoing second network device, for example, a server. The apparatus includes a communications unit 1701, configured to receive a first RPC sent by a first network device, where the first RPC carries information about target invalid data that needs to be deleted, and a processing unit 1702, configured to delete the target invalid data based on the first RPC.

In an example embodiment, the communications unit 1701 is further configured to receive a second RPC sent by the first network device, where the second RPC is used to indicate the second network device to perform data difference comparison.

The processing unit 1702 is further configured to perform, based on the second RPC, data difference comparison, to obtain a data difference comparison result.

The communications unit 1701 is further configured to return the data difference comparison result to the first network device, where the difference comparison result is used by the first network device to determine target invalid data existing in the second network device.

In an example embodiment, the communications unit 1701 is further configured to send a base event notification to the first network device, where the base event notification is used to indicate that invalid data exists in the second network device.

In an example embodiment, the communications unit 1701 is further configured to receive a third RPC sent by the first network device, where the third RPC is used to indicate the second network device to return first data, and return the first data to the first network device based on the third RPC, where the first data is used by the first network device to determine the target invalid data existing in the second network device.

In an example embodiment, the communications unit 1701 is further configured to receive the third RPC sent by the first network device, where the third RPC is used to indicate the second network device to return the first data, and return an error identifier to the first network device, where the error identifier is used to indicate that second data referenced by the first data has been deleted.

In an example embodiment, the communications unit 1701 is further configured to establish a network configuration session with the first network device, and send, based on the network configuration session, a residual network configuration data clearing capability that is supported by the second network device to the first network device.

In an example embodiment, the target invalid data is data corresponding to a referred node, and a data model in which a referring node corresponding to the referred node is located includes an extended first statement, where the first statement is used to indicate to automatically and associatively delete data corresponding to the referring node when the target invalid data is deleted.

The processing unit 1702 is further configured to automatically and associatively delete, based on the first statement, the data corresponding to the referring node.

In an example embodiment, the target invalid data is data corresponding to a referred node, and a data model in which the target invalid data is located includes an extended second statement, where the second statement is used to indicate to associatively delete data corresponding to all referring nodes when the target invalid data is deleted.

The processing unit 1702 is further configured to associatively delete, based on the second statement, the data corresponding to all the referring nodes.

In the method provided in this embodiment of this application, invalid data is cleared based on an RPC that is sent by the first network device and that is used to clear invalid data, thereby saving device resources and improving operation and maintenance management efficiency. In addition, when the invalid data is cleared, because the method provided in this embodiment of this application further supports deletion of other data that references the invalid data, the device resources may be further saved, and the operation and maintenance management efficiency may be improved.

It should be understood that, the apparatus provided in FIG. 16 or FIG. 17 implements a function of the apparatus, division of the foregoing functional modules is used as an example for description. In actual application, the foregoing functions may be allocated to different functional modules as required. In other words, the internal structure of the device is divided into different functional modules, to implement all or part of the functions described above. In addition, the apparatus provided in the foregoing embodiment and the method embodiments belong to a same idea. For a specific implementation process, refer to the method embodiments. Details are not described herein again.

In the foregoing embodiment, the first network device or the second network device may be a router or a switch. A hardware structure may include but is not limited to the following two structures.

Figure 18:
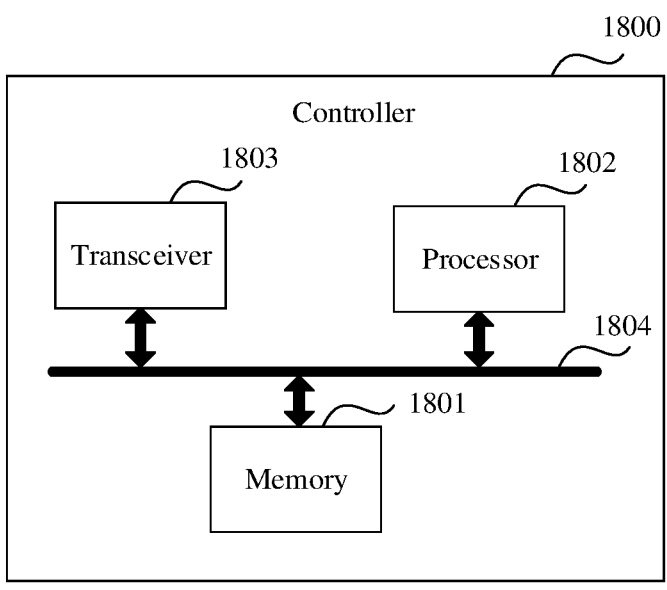
FIG. 18 is a schematic diagram of a structure of a network device according to an embodiment of this application.

First structure. As shown in FIG. 18, a network device 1800 includes a transceiver 1803, a processor 1802, and a memory 18*oi*. The transceiver 1803 is configured to receive a packet, data information, or the like, and the processor 1802 is configured to perform related steps processed by the first network device or the second network device in the embodiment shown in FIG. 3.

Figure 19:
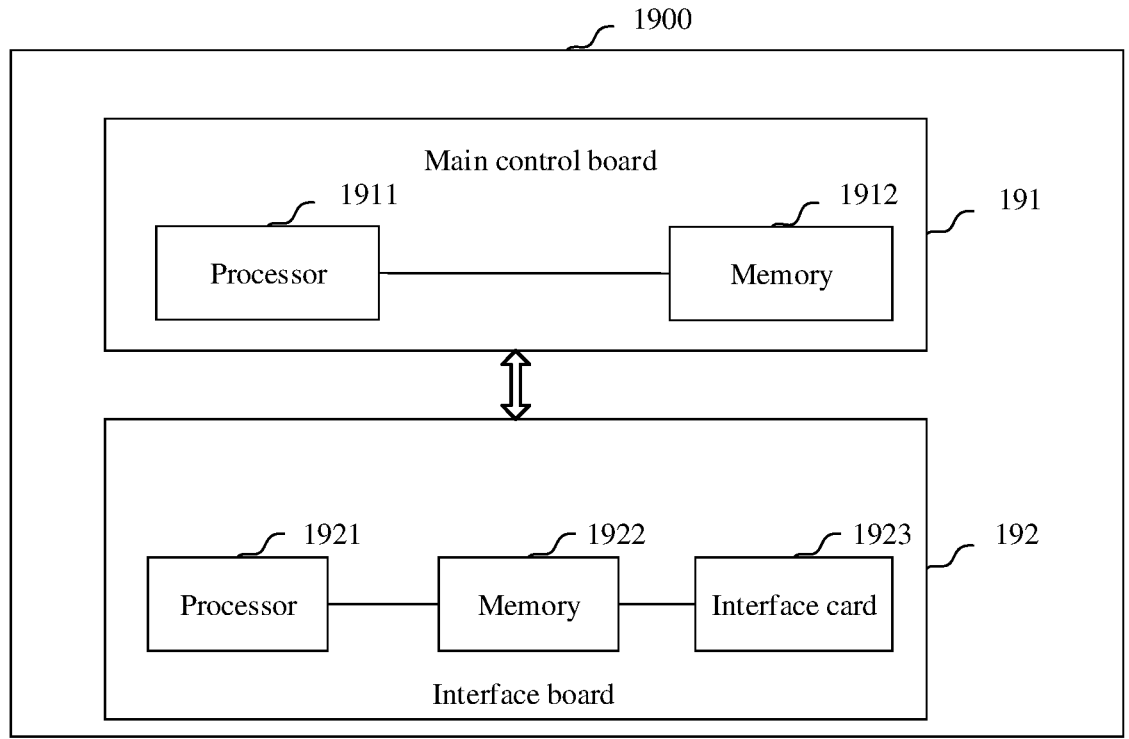
FIG. 19 is a schematic diagram of a structure of a network device according to an embodiment of this application.

Second structure. As shown in FIG. 19, a network device 1900 includes a main control board 191 and an interface board 192, where the main control board 191 includes a processor 1911 and a memory 1912, and the interface board 192 includes a processor 1921, a memory 1922, and an interface card 1923. The processor 1921 of the interface board 192 is configured to call program instructions in the memory 1922 of the interface board 192 to perform a corresponding processing function. The processor 1911 of the main control board 191 is configured to call program instructions in the memory 1912 of the main control board 191 to perform a corresponding processing function.

It should be noted that any apparatus embodiment described above is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the embodiments of the first network node or the controller provided in this application, connection relationships between modules indicate that the modules have communication connections with each other, and may be specifically implemented as one or more communications buses or signal cables. Persons of ordinary skill in the art may understand and implement the embodiments without creative efforts.

Figure 20:
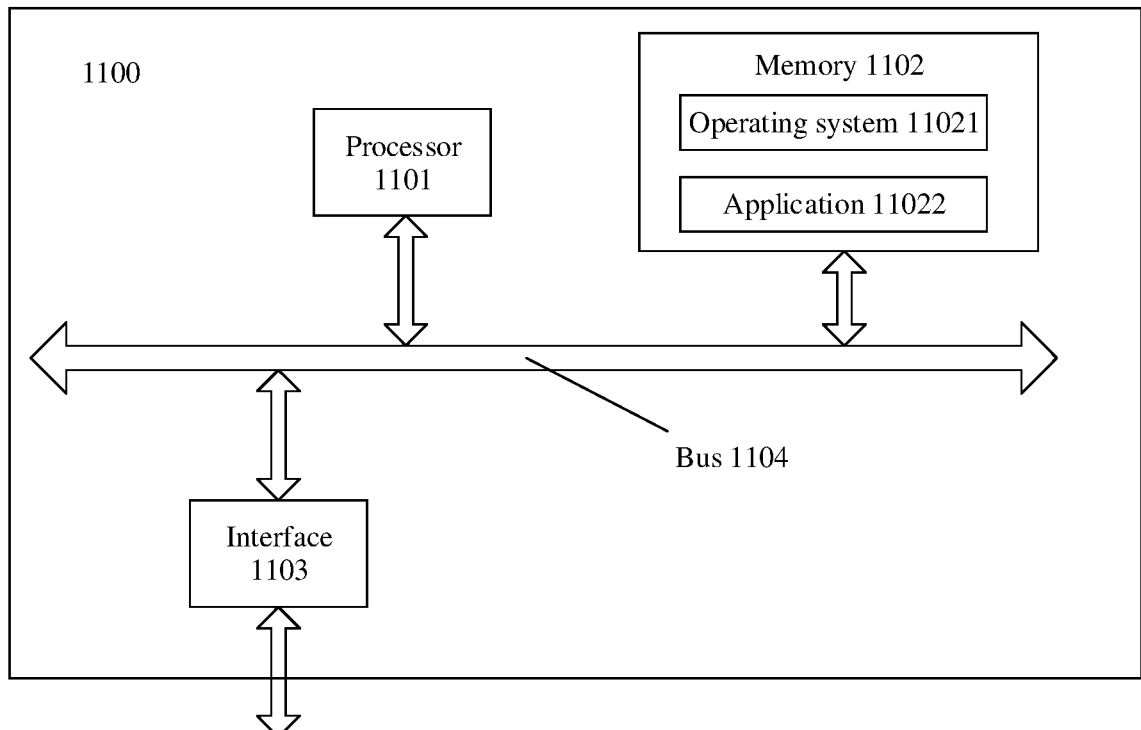
FIG. 20 is a schematic diagram of a structure of a network device according to an embodiment of this application.

FIG. 20 is a schematic diagram of a hardware structure of a network device according to an embodiment of this application. The network device 1100 shown in FIG. 20 may perform corresponding steps performed by the first network device or the second network device in the method in the foregoing embodiment.

As shown in FIG. 20, the network device 1100 includes a processor 1101, a memory 1102, an interface 1103, and a bus 1104. The interface 1103 may be implemented in a wireless or wired manner, and specifically, may be a network adapter. The processor 1101, the memory 1102, and the interface 1103 are connected through the bus 1104.

The interface 1103 may include a transmitter and a receiver that are configured to receive and transmit an RPC or data. For example, the interface 1103 is configured to support receiving an RPC. The processor 1101 is configured to perform processing performed by the network device in the foregoing embodiment. For example, the processor 1101 is configured to support data management steps in step 301 to step 305 in FIG. 3. The memory 1102 includes an operating system 11021 and an application 11022, and is configured to store a program, code, or instructions. When the processor 1101 or a hardware device executes the program, code, or instructions, a processing process related to the network device in the method embodiments may be completed. Optionally, the memory 1102 may include a read-only memory (ROM) and a random access memory (RAM). The ROM includes a basic input/output system (BIOS) or an embedded system. The RAM includes an application and an operating system. When the network device 1100 needs to be run, a system is booted by using a BIOS fixed in the ROM or a bootloader in the embedded system, to boot the network device 1100 into a normal running state. After the network device 1100 enters the normal running state, the application and the operating system in the RAM are run, to complete a processing process related to the network device in the method embodiments.

It may be understood that FIG. 20 shows only a simplified design of the network device 1100. In actual application, the network device 1100 may include any quantity of interfaces, processors, or memories.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machine (advanced RISC machines, ARM) architecture.

Further, in an optional embodiment, the memory may include a read-only memory and a random access memory, and provide instructions and data for the processor. The memory may alternatively include a non-volatile random access memory. For example, the memory may further store information of a device type.

The memory may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. By way of example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A computer-readable storage medium is further provided. The storage medium stores at least one instruction, and a processor loads and executes the instruction to implement any one of the foregoing data management methods.

This application provides a computer program. When the computer program is executed by a computer, a processor or the computer is enabled to perform corresponding steps and/or procedures in the foregoing method embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk), or the like.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method comprising:
  determining, by a first network device, target invalid data in a second network device,
  wherein the determining the target invalid data in the second network device comprises:
    sending, by the first network device, a second remote procedure call (RPC) or a third RPC to the second network device;
    obtaining, by the first network device, a first RPC, wherein the first RPC carries information about the target invalid data that needs to be deleted; and sending, by the first network device, the first RPC to the second network device, wherein the first RPC indicates the second network device to delete the target invalid data.

2. The method according to claim 1, wherein the second RPC indicates the second network device to perform data difference comparison, and wherein the determining, by the first network device, the target invalid data in the second network device further comprises:
  receiving, by the first network device, a data difference comparison result returned by the second network device; and
  determining, by the first network device, based on the data difference comparison result, the target invalid data in the second network device.

3. The method according to claim 2, wherein before the sending, by the first network device, the second RPC to the second network device, the method further comprises:
  receiving, by the first network device, a basic event notification sent by the second network device, wherein the basic event notification indicates that invalid data exists in the second network device; and
  determining, by the first network device, based on the basic event notification, that the invalid data exists in the second network device; and
  triggering the sending of the second RPC to the second network device.

4. The method according to claim 1, wherein the third RPC indicates to the second network device to return first data, and wherein the determining, by the first network device, the target invalid data in the second network device further comprises:
  receiving, by the first network device, the first data returned by the second network device; and
  determining, by the first network device, in response to determining that second data referenced by the first data does not exist, that the first data is the target invalid data in the second network device.

5. The method according to claim 1, wherein the third RPC indicates the second network device to return first data, and wherein the determining, by the first network device, the target invalid data in the second network device further comprises:
  receiving, by the first network device, an error identifier returned by the second network device, wherein the error identifier indicates that second data referenced by the first data has been deleted; and
  determining, by the first network device, based on the error identifier, the first data as the target invalid data in the second network device.

6. The method according to claim 1, wherein before the determining, by the first network device, the target invalid data in the second network device, the method further comprises:
  establishing, by the first network device, a network configuration session with the second network device; and
  receiving, by the first network device based on the network configuration session, information indicating a residual network configuration data clearing capability that is sent by the second network device and that is supported by the second network device.

7. The method according to claim 1, wherein the first RPC is a new RPC, wherein an input parameter of the new RPC comprises the information about the target invalid data that needs to be deleted; or the first RPC is an extended RPC obtained by extending an existing RPC, wherein the extended RPC carries the information about the target invalid data that needs to be deleted.

8. The method according to claim 1, wherein after the sending, by the first network device, the first RPC to the second network device, the method further comprises:

reading, by the first network device, the target invalid data in the second network device; and verifying, based on reading the target invalid data, whether the target invalid data is cleared.

9. An apparatus, wherein the apparatus comprises:

at least one processor;

at least one non-transitory computer-readable storage medium storing a program to be executed by the at least one processor, the program including instructions to cause the apparatus to perform operations including:

determining target invalid data in a second network device, wherein the determining the target invalid data in the second network device comprises:

sending a second remote procedure call (RPC) or a third RPC to the second network device; and obtaining a first RPC, wherein the first RPC carries information about target invalid data that needs to be deleted; and sending the first RPC to the second network device, wherein the first RPC indicates to the second network device to delete the target invalid data.

10. The apparatus according to claim 9, wherein the second RPC indicates the second network device to perform data difference comparison, and wherein the determining the target invalid data further comprises:

receiving a data difference comparison result returned by the second network device; and determining, based on the data difference comparison result, the target invalid data in the second network device.

11. The apparatus according to claim 10, wherein before the sending the second RPC to the second network device, the operations further comprise:

receiving a basic event notification sent by the second network device, wherein the basic event notification indicates that invalid data exists in the second network device;

determining, based on the basic event notification, that the invalid data exists in the second network device; and triggering the sending of the second RPC to the second network device.

12. The apparatus according to claim 9, wherein the third RPC indicates to the second network device to return first data, and wherein the determining the target invalid data in the second network device further comprises:

receiving the first data returned by the second network device; and determining, in response to determining that second data referenced by the first data does not exist, that the first data is the target invalid data in the second network device.

13. The apparatus according to claim 9, wherein the third RPC indicates the second network device to return first data, and wherein the determining the target invalid data in the second network device further comprises:

receiving an error identifier returned by the second network device, wherein the error identifier indicates that second data referenced by the first data has been deleted; and determining, based on the error identifier, the first data as the target invalid data in the second network device.

14. The apparatus according to claim 9, wherein before the determining the target invalid data in the second network device, the operations further comprise:

establishing a network configuration session with the second network device; and receiving, based on the network configuration session, information indicating a residual network configuration data clearing capability that is sent by the second network device and that is supported by the second network device.

15. The apparatus according to claim 9, wherein the first RPC is a new RPC, wherein an input parameter of the new RPC comprises the information about the target invalid data that needs to be deleted; or the first RPC is an extended RPC obtained by extending an existing RPC, wherein the extended RPC carries the information about the target invalid data that needs to be deleted.

16. The apparatus according to claim 9, wherein after the sending the first RPC to the second network device, the operations further comprise:

reading the target invalid data in the second network device; and verifying, based on a result of reading the target invalid data, whether the target invalid data is cleared.

17. A non-transitory computer-readable storage medium storing a program to be executed by a first network device, the program including instructions to cause the first network device to perform operations including:

determining target invalid data in a second network device, wherein the determining the target invalid data in the second network device comprises:

sending a second remote procedure call (RPC) or a third RPC to the second network device;

obtaining a first RPC, wherein the first RPC carries information about the target invalid data that needs to be deleted; and sending the first RPC to the second network device, wherein the first RPC indicates to the second network device to delete the target invalid data.

18. The non-transitory computer-readable storage medium according to claim 17, wherein the second RPC indicates the second network device to perform data difference comparison, and wherein the determining the target invalid data further comprises:

receiving a data difference comparison result returned by the second network device; and determining based on the data difference comparison result, the target invalid data in the second network device.

19. The non-transitory computer-readable storage medium according to claim 17, wherein before the sending the second RPC to the second network device, the operations further comprise:

receiving a basic event notification sent by the second network device, wherein the basic event notification indicates that invalid data exists in the second network device;

determining based on the basic event notification, that the invalid data exists in the second network device; and triggering the sending of the second RPC to the second network device.

20. The non-transitory computer-readable storage medium according to claim 17, wherein the third RPC indicates to the second network device to return first data, and wherein the determining the target invalid data in the second network device further comprises:

receiving the first data returned by the second network device; and determining in response to determining that second data referenced by the first data does not exist, that the first data is the target invalid data in the second network device.

\* \* \* \* \*